US010943590B2

(12) United States Patent
Lee

(10) Patent No.: US 10,943,590 B2
(45) Date of Patent: Mar. 9, 2021

(54) WASHING MACHINE AND CONTROL SYSTEM OPERATING BASED ON VOICE RECOGNITION USING ARTIFICIAL INTELLIGENCE, AND METHOD FOR CONTROLLING THEM

(71) Applicant: LG Electronics Inc., Seoul (KR)

(72) Inventor: Heungkyu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/510,382

(22) Filed: Jul. 12, 2019

(65) Prior Publication Data
US 2020/0020336 A1 Jan. 16, 2020

(30) Foreign Application Priority Data

Jul. 13, 2018 (KR) .................. 10-2018-0081722

(51) Int. Cl.
*G10L 15/22* (2006.01)
*G10L 15/18* (2013.01)
(Continued)

(52) U.S. Cl.
CPC .............. *G10L 15/22* (2013.01); *G10L 13/00* (2013.01); *G10L 15/1815* (2013.01);
(Continued)

(58) Field of Classification Search
CPC ......... D06F 39/00; D06F 39/02; G10L 15/00; G10L 15/26
(Continued)

(56) References Cited

U.S. PATENT DOCUMENTS

2011/0060587 A1* 3/2011 Phillips .................. G10L 15/30
704/235
2014/0156082 A1* 6/2014 Ha ....................... H04L 12/2825
700/275
(Continued)

FOREIGN PATENT DOCUMENTS

CN 107227582 10/2017
EP 3502867 6/2019
(Continued)

OTHER PUBLICATIONS

EP Search Report in European Application No. EP19183803, dated Nov. 27, 2019, 10 pages.

*Primary Examiner* — Michael Colucci
(74) *Attorney, Agent, or Firm* — Fish & Richardson P.C.

(57) ABSTRACT

The present invention relates to a washing machine and a server system that recommend a laundry course and washing tip information in consideration of information on a kind of laundry and a degree of contamination inputted by using artificial intelligence through speech recognition, and a method for controlling such washing machine and server system. The present invention extracts a cloth-word indicating a kind of clothes of laundry and a stain-word indicating a kind of contaminant. Then, the present invention determines a laundry course in consideration of the cloth-word. Then, washing tip information on the stain-word is searched in a pre-stored database and the searched washing tip information is provided to a user. As a result, the user can be notified of a washing method capable of effectively removing the contaminant.

14 Claims, 15 Drawing Sheets

(51) Int. Cl.
*G10L 15/30* (2013.01)
*G10L 13/00* (2006.01)
*G10L 15/08* (2006.01)

(52) U.S. Cl.
CPC ........ *G10L 15/30* (2013.01); *G10L 2015/088* (2013.01); *G10L 2015/223* (2013.01)

(58) Field of Classification Search
USPC .......................................................... 704/235
See application file for complete search history.

(56) References Cited

U.S. PATENT DOCUMENTS

| | | | | |
|---|---|---|---|---|
| 2016/0215430 | A1* | 7/2016 | Ha | H04L 12/2823 |
| 2016/0218884 | A1* | 7/2016 | Ebrom | H05B 6/668 |
| 2018/0133583 | A1* | 5/2018 | Tran | A42B 3/0433 |
| 2018/0233806 | A1* | 8/2018 | Yikilmazcinar | H01Q 1/48 |
| 2018/0305856 | A1* | 10/2018 | Welch | G06Q 20/18 |
| 2019/0017207 | A1 | 1/2019 | Li et al. | |
| 2019/0136440 | A1* | 5/2019 | Clarke | C11D 3/40 |
| 2019/0153653 | A1* | 5/2019 | Clayton | D06F 37/266 |
| 2019/0198021 | A1 | 6/2019 | Lee et al. | |
| 2019/0292710 | A1* | 9/2019 | Cooke | C11D 3/38645 |
| 2020/0043274 | A1* | 2/2020 | Hone | G07F 15/04 |

FOREIGN PATENT DOCUMENTS

| | | |
|---|---|---|
| KR | 100112368 | 2/1997 |
| KR | 20120023497 | 3/2012 |
| KR | 20140095779 | 8/2014 |
| KR | 20160068938 | 6/2016 |
| WO | WO2015034278 | 3/2015 |
| WO | WO2015055239 | 4/2015 |
| WO | WO2017118423 | 7/2017 |
| WO | WO2017162188 | 9/2017 |
| WO | WO2018040199 | 3/2018 |

* cited by examiner

WASHING MACHINE AND CONTROL SYSTEM OPERATING BASED ON VOICE RECOGNITION USING ARTIFICIAL INTELLIGENCE, AND METHOD FOR CONTROLLING THEM

CROSS-REFERENCE TO RELATED APPLICATION

This application claims priority under 35 U.S.C. § 119 to Korean Application No. 10-2018-0081722, filed on Jul. 13, 2018, whose entire disclosure is herein incorporated by reference.

1. FIELD OF THE INVENTION

The present disclosure relates to a washing machine and a server system that recommend a laundry course and information on washing tips in consideration of information on laundry and contamination inputted through speech recognition, and a method of controlling the same.

2. DESCRIPTION OF RELATED ART

In recent years, technology that controls home appliances and home electric appliances, and the like, by using speech has been studied in various aspects of the technology. Particularly, with respect to controlling the devices such as home appliances and home electric appliances, and the like, studies have continued to enable an operation of the product based on the speech of a user.

Meanwhile, a washing machine provides various laundry courses. In general, an optimum laundry course depends on a type of laundry and contaminant. However, it is very difficult for the user to know well about all the optimum laundry courses with respect to each laundry.

Accordingly, recently, the washing machine receives information on the kind of laundry and contaminant from a user through speech. Then, based on the inputted speech, the washing machine analyzes an intention of the user. By analyzing an intention of the user, the washing machine can select the most suitable laundry course for the laundry and recommend the selected most suitable laundry course for the laundry to the user.

However, there is a problem that it is difficult to determine which laundry course has to be operated by the washing machine when information on different kinds of laundry is inputted through speech at the same time, and the laundry courses recommended for each kind of laundry conflict with one another.

International patent application (WO 2015/055239) discloses the contents for solving the above problems. Hereinafter, a washing machine in related art will be described with reference to the above prior art documents.

FIGS. 1 and 2 show a method for operating a washing machine in related art.

Referring to FIGS. 1 and 2, a washing machine 1 includes a control unit 2, an interface unit 3, a microphone unit 4, a speaker unit 5, and a display unit 6.

The control unit 2 controls an operation of each component. The interface unit 3 includes a keyboard that enables a manual input by a user. The microphone unit 4 recognizes a speech signal of a user. The speaker unit 5 outputs sound for specific guide speech to the user. The display unit 6 displays a current state of the washing machine 1 on the screen.

At this time, the control unit 2 analyzes the speech signal of the user inputted to the microphone unit 4 to obtain information on a laundry item (S1).

Then, when the process of obtaining information on the laundry item is completed, the control unit 2 selects a laundry cycle (S2). At this time, when information on different kinds of laundry items is obtained, the control unit 2 selects a laundry course for each kind of laundry.

Then, the control unit 2 determines whether the laundry courses for the respective kinds of laundry are in conflict with each other (C2).

If there are the laundry cycles being in conflict with each other, the control unit 2 notifies the user to remove laundry relating to one or more of the conflicting laundry courses (S4).

Then, when the conflicting laundry's removal is confirmed, the control unit 2 starts a laundry course (C3 and S3).

That is, when the laundry courses for various kinds of laundry are conflicted with each other, the washing machine stops a washing operation and notifies the user to remove laundry relating to one or more of the laundry course conflicted with each other.

In this case, the user may classify various kinds of laundry which is in conflict with respect to laundry courses and wash laundry by using one or more separate laundry courses. Therefore, there is a problem that the washing machine cannot simultaneously wash various kinds of laundry the laundry courses of which are in conflict with other, and a total time for washing all the different kinds of laundry by separate laundry courses is lengthened.

Further, in case of washing machine, it is inconvenient for the user to identify an additional washing method suitable for each kind of contaminant since the washing machine does not additionally notify the user of such a washing method dependent on a kind of contaminant. Further, it is inconvenient for the user to configure a separate laundry cycle for removing the contaminant on his own.

Further, when the user simultaneously utters various kinds of laundry and contaminant, there is a problem that the washing machine cannot distinguish which kind of laundry is associated with a particular type of contaminant, and thus, the contaminant cannot be removed completely.

SUMMARY

The present invention provides a washing machine and a server system that recommend an optimum laundry course for a kind of laundry and a kind of contaminant inputted based on speech recognition and provide information on washing tips with respect to the contaminant, and a method for controlling such washing machine and server system.

The present invention further provides a washing machine and a speech recognition server system that configure different washing units of the washing machine with corresponding laundry courses, and provide guide speech about a separate washing when various kinds of laundry needs to be washed by different laundry courses from each other, and a method of controlling such washing machine and speech recognition server system.

The present invention also provides a washing machine and a server system that select a kind of laundry having a high degree of relevance to a contaminant identified from a speech command for washing various kinds of laundry involving the contaminant, and adjust a laundry course of each kind of laundry in consideration of the contaminant and a method of controlling such washing machine and server system.

The objects of the present invention are not limited to the above-mentioned objects, and the other objects and advantages of the present invention, which are not mentioned, can be understood by the following description, and more clearly understood by the embodiments in the present invention. It will be also readily understood that the objects and the advantages of the present invention may be realized by means defined in the appended claims and a combination thereof.

According to the present invention, there is provided a washing machine, a speech recognition server system, and a method for controlling such washing machine and speech recognition server system. The washing machine, the speech recognition server system, and the method for controlling such washing machine and speech recognition server system extract a cloth-word and a stain-word, wherein the cloth-word is a word indicating a kind of clothes of laundry, a fabric name of laundry, or a color of laundry, and the stain-word is a word indicating a kind of contaminant, a color of stain, or a chemical property of stain. Then, the present invention determines a laundry course in consideration of the cloth-word and the stain-word. Then, information on the washing tip with respect to the stain-word is searched from a pre-stored database and the searched the washing tip information is provided to the user. As a result, the user can be notified of a washing method capable of effectively removing the contaminant.

According to the present invention, there is provided a washing machine, a speech recognition server system, and a method of controlling such washing machine and speech recognition server system. The washing machine, the speech recognition server system, and the method of controlling such washing machine and speech recognition server system determine whether laundry courses corresponding to the respective cloth-words are different from each other when a plurality of cloth-words are recognized. Then, according to the present invention, when the determined laundry courses are different from each other, the washing machine configures different washing units of the washing machine with the respective determined laundry course. At this time, according to the present invention, a laundry course for the laundry requiring a separate washing is set for a relatively small washing unit (i.e., a mini washer). Then, the present invention provides guide speech with respect to said separate washing. As a result, the user can be notified to wash the laundry requiring the separate washing in the separate washing unit.

According to the present invention, there is provided a washing machine, a speech recognition server system, and a method of controlling such washing machine and the speech recognition server system. The washing machine, the speech recognition server system and the method of controlling such washing machine and speech recognition server system select a cloth-word having a high degree of relevance to a stain-word, when the plurality of cloth-words and a stain-word are recognized from a speech command from a user. Then, at least one of cycles in a laundry course selected for the cloth-word is changed on the basis of the stain-word. As a result, the user can perform washing with the laundry course capable of effectively removing the contaminant without an additional configuration.

According to the present invention, in the washing machine, the speech recognition server system, and the method of controlling such washing machine and speech recognition server system, the user can be notified of the information on which laundry course is used for washing laundry in response to information on the laundry and contaminant on the laundry provided by a user. Further, the user can be notified of a washing method capable of effectively removing the contaminant. As a result, even though the user does not know well about which laundry courses the washing machine provides, it is possible to wash the laundry by a laundry course optimally selected for the laundry. Further, the user can easily remove the contaminant as the user is notified of a washing tip capable of effectively removing the contaminant. Accordingly, it is possible to effectively use the washing machine, and user satisfaction with respect to the washing machine can be improved. Further, it is also possible to enhance satisfaction with a washing performance.

Further, according to the present invention, in the washing machine, the speech recognition server system and the method of controlling such washing machine and speech recognition server system, the user may be notified of information on which laundry, which washing unit of the washing machine, which laundry course have to be used for washing in response to the information on various kinds of laundry provided by a user. Further, the user is notified of each optimum laundry course for the respective kinds of laundry without a user's additional configuration to perform the washing. As a result, the present invention can prevent dye migration or spreading of contamination among laundry, which may occur when various kinds of laundry is washed in a same washing unit by one same laundry course. Therefore, it is also possible to perform washing of laundry by the laundry courses optimized for each kind of laundry, and thereby a washing performance can be improved. Further, as it is possible to wash different kinds of laundry at the same time by using different washing units of the washing machine, the washing time can be reduced.

Further, according to the present invention, the washing machine, the speech recognition server system, and the method of controlling such washing machine and speech recognition server system select a kind of laundry related to a contaminant from various kinds of laundry and the contaminant inputted by a user based on speech recognition. Subsequently, at least one of cycles (a rinsing, dehydration cycle, a drying, and the like) of a laundry course selected for the laundry is changed. As a result, the user can be recommended with an optimum laundry course for the laundry having the contaminant without the user selecting the laundry course or an option item for the laundry course on his/her own. Accordingly, the user can wash various kinds of laundry in the laundry course capable of effectively removing the contaminant without the user's additional configuration.

The present invention may be implemented by cooperation of a washing machine with a server system, or by a washing machine itself.

The effects of the present invention are not limited to the effects described above, and those skilled in the art of the present invention can easily understand various effects of the present invention based on the disclosure of the present invention.

DETAILED DESCRIPTION OF EXEMPLARY EMBODIMENTS

Figure 1:
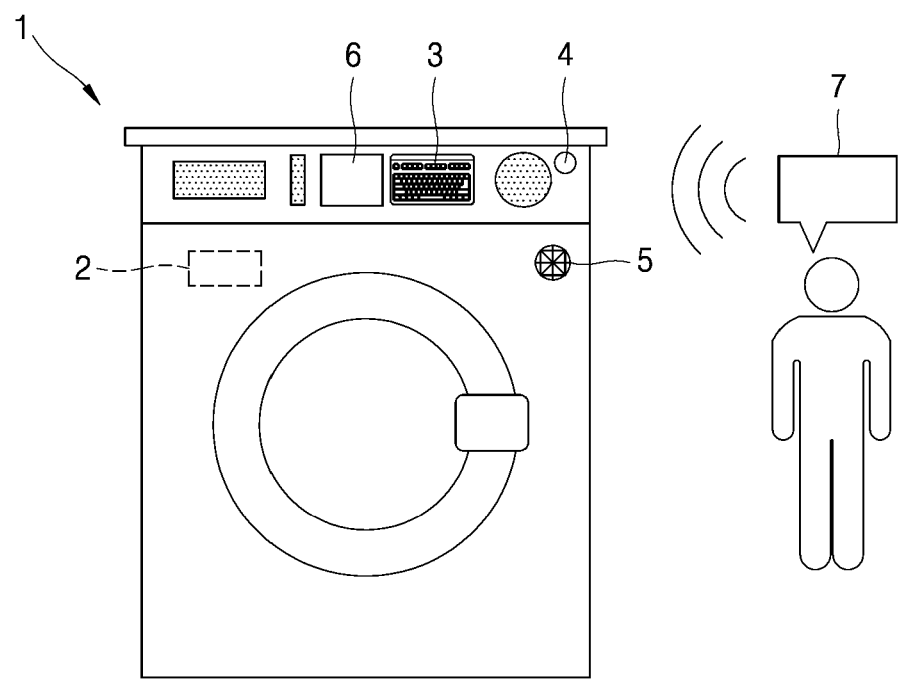
FIGS. 1 and 2 show an operation method of a washing machine.
Figure 2:
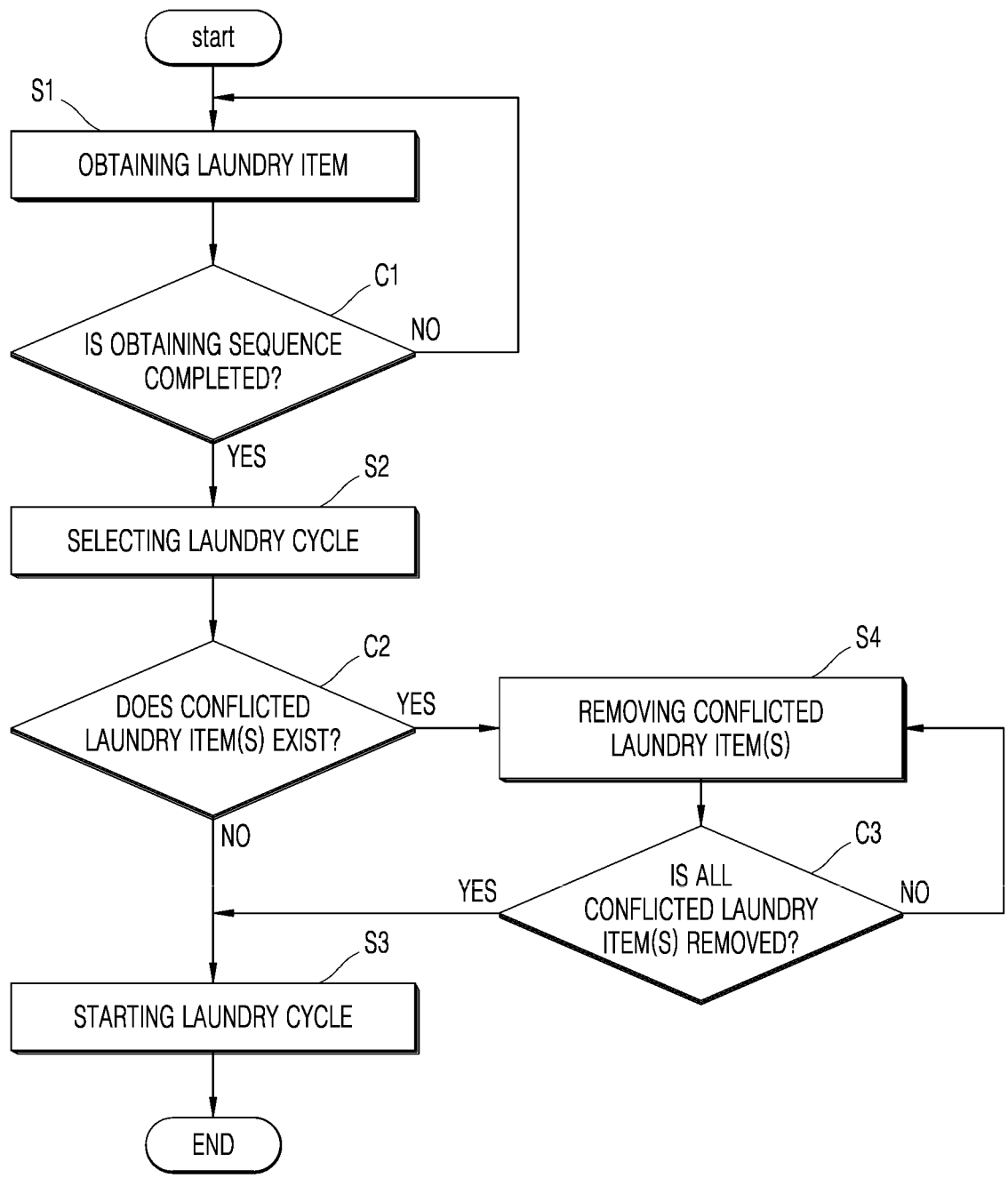

The advantages and the features of the present invention and the manner of achieving them will become apparent with reference to the embodiments described in detail below with reference to the accompanying drawings. However, the present invention is not limited to the embodiments disclosed in the below but may be embodied in many different manners from each other. These embodiments are provided so that the present invention will be thorough and complete, and are provided to fully convey the scope of the present invention to those skilled in the art to which the present invention pertains, and the present invention is only defined by the scope of claims. Like reference numerals refer to like elements throughout the specification.

Unless defined otherwise, all terms (including the technical and scientific terms) used in the present specification may be used in a sense commonly understood by those skilled in the art to which the present invention pertains. Further, the commonly used terms, which are defined in a dictionary, are not ideally or excessively interpreted unless explicitly and particularly defined otherwise.

Further, with respect to implementation of the present invention, although it may be described by subdividing the component for convenience of explanation, the components may be implemented within a device or a module, or a component may be implemented by being divided into a plurality of devices or modules.

In this specification, the washing machine means equipment that performs a complex cycle for washing or drying laundry. At this time, the washing machine can perform various functions in addition to washing or drying.

Further, in this specification, laundry means an object made of clothes. For example, the laundry may include T-shirts, Y-shirts, pants, underwear, blankets, blankets, towels, dolls, and the like.

Hereinafter, according to some embodiments of the present invention, a washing machine and a server system that operate on the basis of speech recognition and a method of controlling such washing machine and server system will be described with reference to FIGS. 3 to 15.

Figure 3:
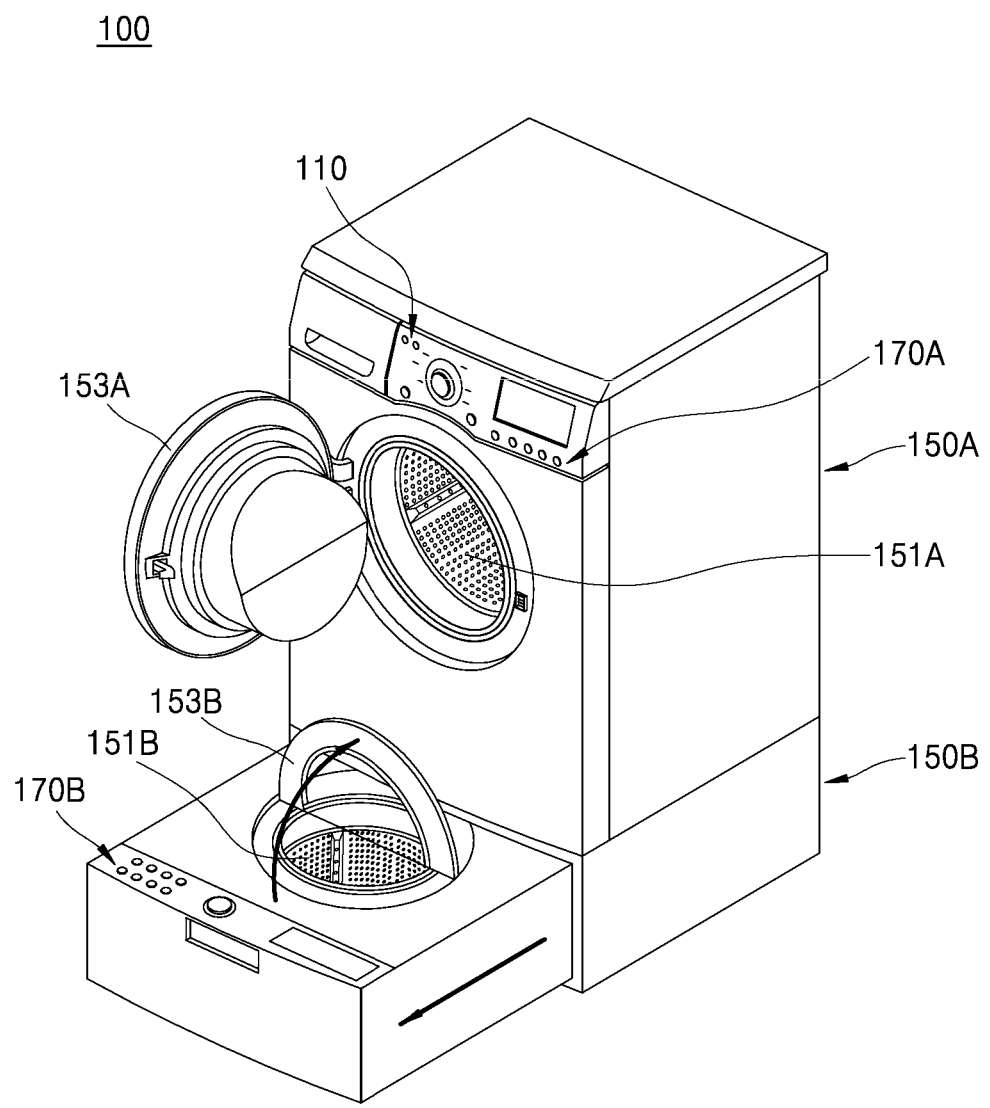
FIG. 3 is a perspective view of a washing machine according to an implementation of the present disclosure.

FIG. 3 is a perspective view of a washing machine according to an embodiment of the present disclosure.

Referring to FIG. 3, according to an embodiment of the present invention, a washing machine 100 includes a plurality of washing units. Specifically, the washing machine 100 may include a first washing unit 150A and a second washing unit 150B.

The first washing unit 150A and the second washing unit 150B may be arranged adjacent to each other. For example, the first washing unit 150A and the second washing unit 150B may be arranged in the upper and lower sides, respectively.

At this time, the first washing unit 150A and the second washing unit 150B may be coupled to and separated from each other. The first washing unit 150A and the second washing unit 150B may have respective housings. Here, each of the housings may be coupled to and separated from each other.

Further, the first washing unit 150A and the second washing unit 150B may be arranged in a single housing. In this case, the first washing unit 150A and the second washing unit 150B may be fixed in the housing and may not be separated from each other.

The first washing unit 150A and the second washing unit 150B may be a front load type or a top load type, respectively.

Here, the front load type may have a form in which laundry is inputted to an inside of a tub from a front surface. Therefore, in the front load type, the tub in which the laundry is processed rotates horizontal axis substantially.

On the other hand, the top load type may have a form in which laundry is inputted to an inside of a tub from an upper surface of the washing machine. Therefore, in the top load type, the tub in which the laundry is processed rotates vertical axis substantially.

FIG. 3 shows that the first washing unit 150A is the front load type and the second washing unit 150B is the top load type. However, the present invention is not limited thereto, and the first washing unit 150A and the second washing unit 150B may be modified in various ways and implemented.

Hereinafter, for reference, the first washing unit 150A is as the front load type and the second washing unit 150B is as the top load type as an example.

The first washing unit 150A may include a first tub 151A, a first door 153A, and a first interface unit 170A. The second washing unit 150B may include a second tub 151B, a second door 153B, and a second interface unit 170B.

That is, the first washing unit 150A and the second washing unit 150B may include the tubs 151A and 151B, doors 153A and 153B, and interface units 170A and 170B, respectively.

Accordingly, the first washing unit 150A and the second washing unit 150B can operate independently of each other.

Further, the sizes of the first tub 151A and the second tub 151B may be different from each other. For example, a washing capacity of the first tub 151A may be greater than a washing capacity of the tub of the second tub 151B.

Therefore, the first washing unit 150A having a relatively large amount of washing capacity can be used to process a large amount of laundry. Hereinafter, the first washing unit 150A defined as a main washer will be described.

On the other hand, the second washing unit 150B having a relatively small washing capacity can be used for washing a small amount of laundry, or for pre-washing laundry with contaminant, or for washing clothes (for example, jeans) having high risk of dye migration. Hereinafter, the second washing machine 150B defined as a mini washer will be described.

Here, the washing machine 100 may receive a laundry command for the kinds of laundry and a contaminant from the user through speech recognition. Then, the washing machine 100 may determine whether the separate laundry is needed or not when the recognized laundry is the plural. Then, when the separate washing is required, the washing machine 100 determines laundry so as to be washed in each of the washing units 150A and 150B. Then, the washing machine 100 may configure a laundry course for determined laundry in each of the washing units 150A and 150B, and may output information on washing tips of laundry to sound. The description thereof will be described in detail below.

Figure 4:
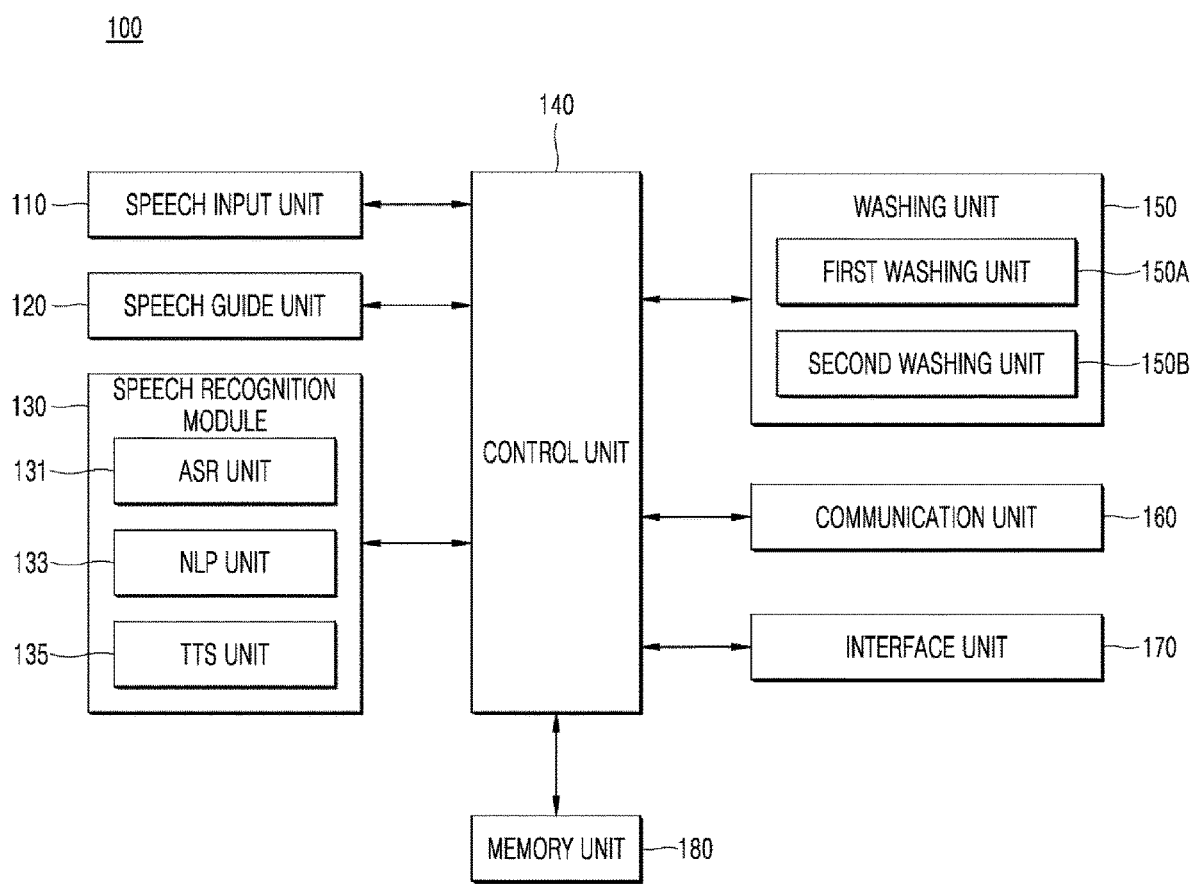
FIG. 4 is a block diagram of a washing machine according to an implementation of the present disclosure.

FIG. 4 is a block diagram of a washing machine according to an implementation of the present disclosure.

One or more of the components described with reference to FIG. 4 may be implemented by at least one processor that is operably connected to at least one computer memory storing instructions that perform various operations described herein when executed by the at least one processor.

Referring to FIG. 4, according to an implementation of the present disclosure, a washing machine 100 may include a speech input unit 110, a speech guide unit 120, a speech recognition module 130, a control unit 140, a washing unit 150, a communication unit 160, an interface unit 170, and a memory unit 180.

The speech input unit 110 can receive a speech command from a user. For this purpose, the speech input unit 110 may include one or more microphones (MIC).

For reference, in order to more accurately receive a speech command from a user, the speech input unit 110 may include a plurality of MICs. At this time, the plurality of MICs may be spaced apart from each other.

The speech input unit 110 may remove noise by comparing a lot of data received from the plurality of MICs. The speech input unit 110 may use various noise reducing algorithms to remove noise generated in a process of receiving the speech command of the user. Further, the speech input unit 110 may include the configurations for processing audio signal, for example, a filter that removes noise from an audio signal received from each MIC, and an amplifier that amplifies a signal outputted from the filter and outputs the amplified signal. As a result, the speech input unit 110 can correctly receive the speech command of the user.

The speech guide unit 120 can convert speech data to sound and output the converted sound. The speech guide unit 120 may include a component (for example, a speaker, and the like) that converts an electric signal into sound. The speech guide unit 120 can receive speech data from a TTS unit 135 to be described later.

Further, the speech guide unit 120 may output guide speech including information on a laundry course configured in the washing machine 100, information on the kinds of clothes of laundry, information on a washing method of a contaminant, tip information on a washing method of laundry, and information on a separate washing to sound. How-ever, they are merely some embodiments, but the present invention is not limited thereto.

The speech recognition module 130 receives a speech command of a user from a speech input unit 110. Then, the speech recognition module 130 may extract one or more keywords included in a received speech command.

The extracted keyword(s) includes a cloth-word (i.e., clothing word or cloth word) that indicates a feature of laundry (or clothes) and a stain-word (i.e., stain word) that indicates a feature of contaminant on laundry.

Here, the cloth-word includes a type of laundry, a fabric name of laundry, or a color of laundry, and the like. Types of laundry may be skirts, blouse, pants, underwear, outdoor, sportswear, towel, baby clothes, blankets, and dolls, and the like. The fabric name of the laundry may be cotton, wool, silk, polyester, nylon, Gore-tex, duck down, and the like. The color of laundry may include color information of laundry.

Further, the stain-word may include a name of a contaminant, a color of a contaminant, a chemical property of a contaminant, or a degree of contamination of a contaminant, and the like. For example, the name of the contaminant may include Coffee, Tea, Fruit, Wine, Make-up, Fat, Oil, Lipstick, Curry, Pepper, Ketchup, Shoe polish, Grease, Cocoa, Tomato sauce, Blood, and Grass, and the like.

Further, various names of colors such as black, red, and the like can be an example of the stain-word indicating the contaminant. Further, oil, an aqueous fluid, solid, liquid dust, powder, and an adhesive, and the like may be an example of a stain-word indicating the chemical property of a contaminant.

In addition, the stain-word may include the contamination degree of a contaminant or temporal property information on a contaminant. For example, the words such as little dirty, dirty, or very dirty, and the like, can indicate the contamination degree of the contaminant. Further, the words such as a week before, a little while ago, old stains, and old stains, and the like, may be an example of a stain-word indicating the temporal information of the contaminant.

The speech recognition module 130 includes an automatic speech recognition (ASR) (hereinafter; ASR) unit 131, a natural language processing (NLP) (hereinafter; NLP) or natural language understanding) unit 133, and a text to speech (TTS) (hereinafter; TTS) unit 135.

The ASR unit 131 converts speech data received from a speech input unit 110 into text data. The ASR unit 131 may be variously expressed as a natural language recognition unit or a speech recognition unit and the like. The ASR unit 131 can use various techniques and algorithms for converting speech data into text data. The text data converted by the ASR unit 131 may be transmitted to the NLP unit 133.

The NLP unit 133 may analyze a pre-stored natural language processing algorithm to determine a speech command. The NLP unit 133 can process a natural language, which a person routinely uses according to a natural language processing algorithm, and can analyze an intention of the user. That is, the NLP unit 133 can perform a natural language processing on text data received from the ASR unit 131 to determine a speech command that meets with the intent of the user. The NLP unit 133 may be variously expressed as an intention analysis unit, a NLP unit, or a complex sentence recognition portion, and the like. The NLP unit 133 may use various techniques and algorithms for determining the intention of the user.

Specifically, the NLP unit 133 analyzes the text data received from the ASR unit 131 and extracts one or more keywords for the speech command. Here, the keyword includes the above-mentioned cloth-word and stain-word.

Then, the NLP unit 133 may determine a laundry course corresponding to or related to the extracted cloth-word and stain-word. A method of determining a laundry course by the NLP unit 133 will be described in detail with reference to FIG. 8.

Further, the NLP unit 133 determines whether the extracted cloth-word is in the plural or not. When the extracted cloth-word is in the plural, the NLP unit 133 determines one or more laundry courses in consideration of each cloth-word.

Then, the NLP unit 133 determines whether or not all the laundry courses corresponding to the respective cloth-words are the same or identical. For example, the NLP unit 133 determines whether a first laundry course determined corresponding to or related to the extracted first cloth-word and a second laundry course determined corresponding to the extracted second cloth-word are the same or identical.

Then, when the first laundry course and the second laundry course are different from each other, the NLP unit 133 determines that a separate washing is needed. Then, the NLP unit 133 determines which laundry course out of the first and second laundry courses is set for the first washing unit 150A and the second washing unit 150B respectively. Then, the NLP unit 133 transmits the determined result to a control unit 140.

On the other hand, if the first laundry course and second laundry course are not different from each other, the NLP unit 133 determines that all the laundry can be washed together, so that it is possible to transmit only one laundry course to the control unit 140.

The description thereof will be described in detail with reference to FIGS. 9 and 10 below.

The TTS unit 135 converts text into speech data. The TTS unit 135 may be variously expressed as a speech synthesis unit or a speech conversion unit, and the like. The TTS unit 135 can use various techniques and algorithms for converting text into speech data.

The TTS unit 135 transmits the converted speech data to a speech guide unit 120. At this time, text that the TTS unit 135 receives may include the above-mentioned guide speech. The TTS unit 135 may receive the guide speech from an NLP unit 133 or a control unit 140.

The control unit 140 may perform an overall control of a component of the washing machine 100.

For example, the control unit 140 controls an operation of a washing unit 150 based on the laundry course determined by the NLP unit 133. Further, the control unit 140 can extract washing tip information with respect to a stain-word from a pre-stored database (not shown). The extracted washing tip information can be transmitted to a TTS unit 135 in a form of guide speech.

Further, the control unit 140 may provide predetermined information to the user through visual or auditory means with respect to each step of recognizing a speech and controlling a washing machine.

For example, the control unit 140 may display visual information on recognizing speech and controlling the washing machine on an interface unit 170. Further, the control unit 140 may provide auditory information on recognizing speech and controlling the washing machine through a speech guide unit 120.

The washing unit 150 may include the above-mentioned first washing unit 150A and second washing unit 150B. As mentioned above, the first washing unit 150A and the second washing unit 150B can be operated in individual laundry courses. At this time, the first washing unit 150A can be used as a main washer that processes a relatively large amount of laundry. On the other hand, the second washing unit 150B can be used as a mini washer that processes a relatively small amount of laundry. The first washing unit and the second washing unit can be interchangeable.

The communication unit 160 includes one or more communication modules. As a result, the communication unit 160 performs a wireless communication with other electronic devices to transmit and receive to and from various signals. For example, the communication unit 160 can transmit and receive data to and from separate servers by using a wireless Internet network.

The interface unit 170 may include a plurality of operation buttons and a display. By using the plurality of operation buttons, the user can configure a laundry course or an additional washing option. The display can display information on a command input by a user, a processing result with respect to a command input by the user, an operation course, an operation state, and an error state, and the like. Further, the interface unit 170 may have a form in which a touch pad and a touch screen are coupled to each other.

The memory unit 180 may record various types of information needed for an operation of a washing machine, and may include a volatile or nonvolatile recording medium. In the memory unit 180, data for speech recognition and data for laundry course determination can be stored in a database form.

For example, the memory unit 180 may include an algorithm for recognizing a cloth-word and a stain-word as keywords.

Further, the memory unit 180 may include a first database that stores information on a laundry course determined based on the cloth-word and an additional washing option determined based on the stain-word, and a second database that includes washing tip information on the stain-word, which is additional information useful for effectively removing stain related to the stain-word.

For reference, the control unit 140 of the washing machine 100 may perform machine learning with respect to the received speech data. The memory unit 180 may store data used for machine learning, and result data, and the like.

In more detail, deep learning technology, which is a type of machine learning, proposes the learning by deep level in multi-steps based on data.

Deep learning can represent a set of machine learning algorithms that extract key data from a plurality of data as it becomes high step.

The deep learning structure may include an artificial neural network (ANN). For example, the deep learning structure may include a deep neural network (DNN), for example, a convolutional neural network (CNN), a recurrent neural network (RNN), and a deep belief network (DBN), and the like.

The control unit 140 may use various known deep learning structures. For example, the control unit 140 may use a structure such as a convolutional neural network (CNN), a recurrent neural network (RNN), and a deep belief network (DBN), and the like.

Specifically, convolutional neural network (CNN) is a model that simulates a brain function of human, which is made based on the assumption that extracts the basic features of an object when a person recognizes an object and then complex calculation is made in the brain and recognizes the object based on the result thereof.

The recurrent neural network (RNN) may be used for a natural language processing, and the like and is a structure effective for time-series data processing that changes with time, and may form an ANN structure by stacking layers every time.

The deep belief network (DBN) is a deep learning structure that is made by stacking restricted boltzman machine (RBM) with multi layers, which is a deep learning technique. When the restricted boltzman machine (RBM) learning is repeated and the predetermined number of layers are formed, the deep belief network (DBN) having the number of layers can be formed.

On the other hand, the ANN learning of the control unit 140 may be made by adjusting the weight of the inter-node connection line (adjusting the bias value if needed) so that a desired output is obtained for a given input.

Further, the ANN can continuously update the weight value by learning. Further, a method such as a back propagation, and the like, can be used for the ANN learning.

Meanwhile, the memory unit 180 may include an ANN pre-learned by machine learning.

That is, according to the present invention, the washing machine 100 can perform the machine learning based speech recognition with the received speech data as the input data. At this time, both of unsupervised learning and supervised learning can be used as a machine learning method of the ANN. Further, the control unit 140 may control to update the speech recognition ANN structure after learning according to the configuration.

In another embodiment of the present invention, the speech recognition module 130 and the control unit 140 may be formed with an external server, respectively. Hereinafter, a speech recognition server system 200 including a speech recognition server 200 that performs an operation of the speech recognition module 130 and a control server 240 that performs an operation of the control unit 140 will be described with reference to FIGS. 5 and 6.

Figure 5:
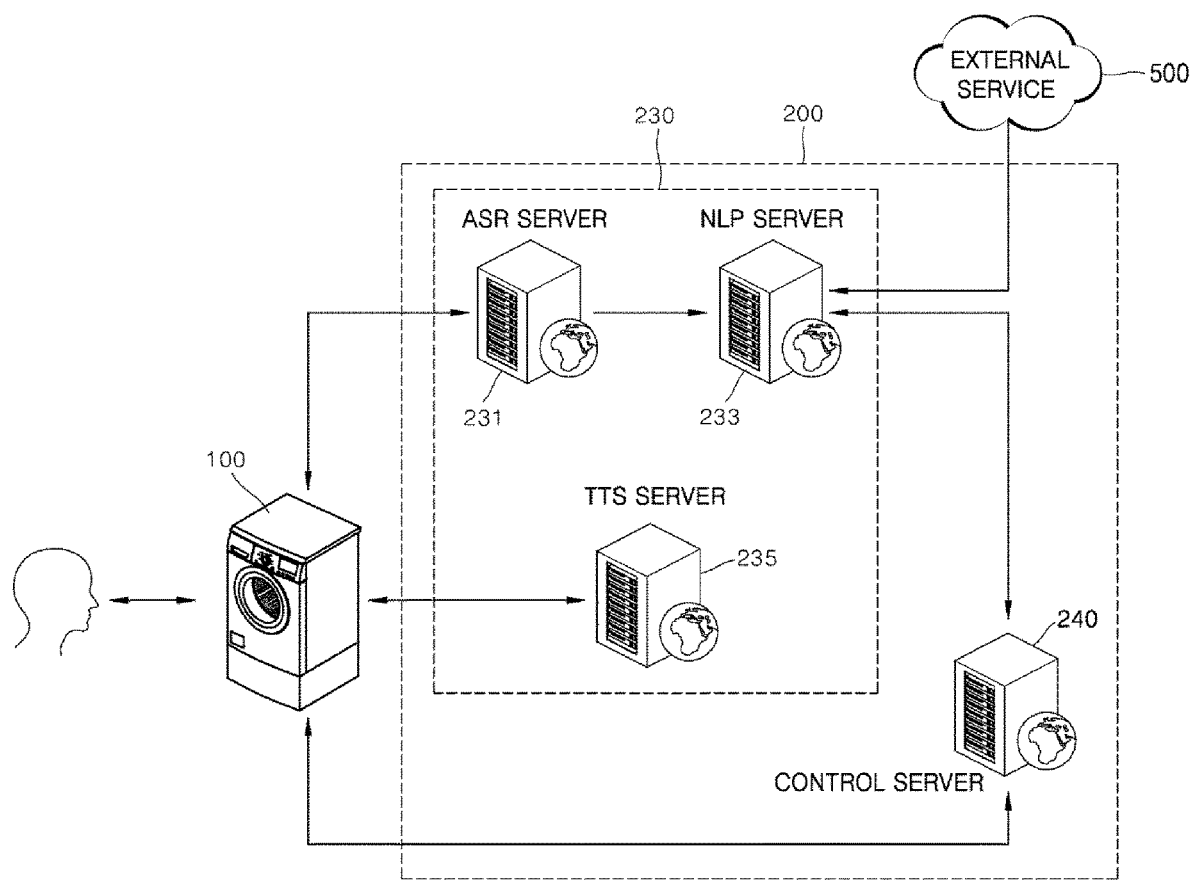
FIG. 5 shows a speech recognition server system that controls a washing machine according to another implementation of the present disclosure.
Figure 6:
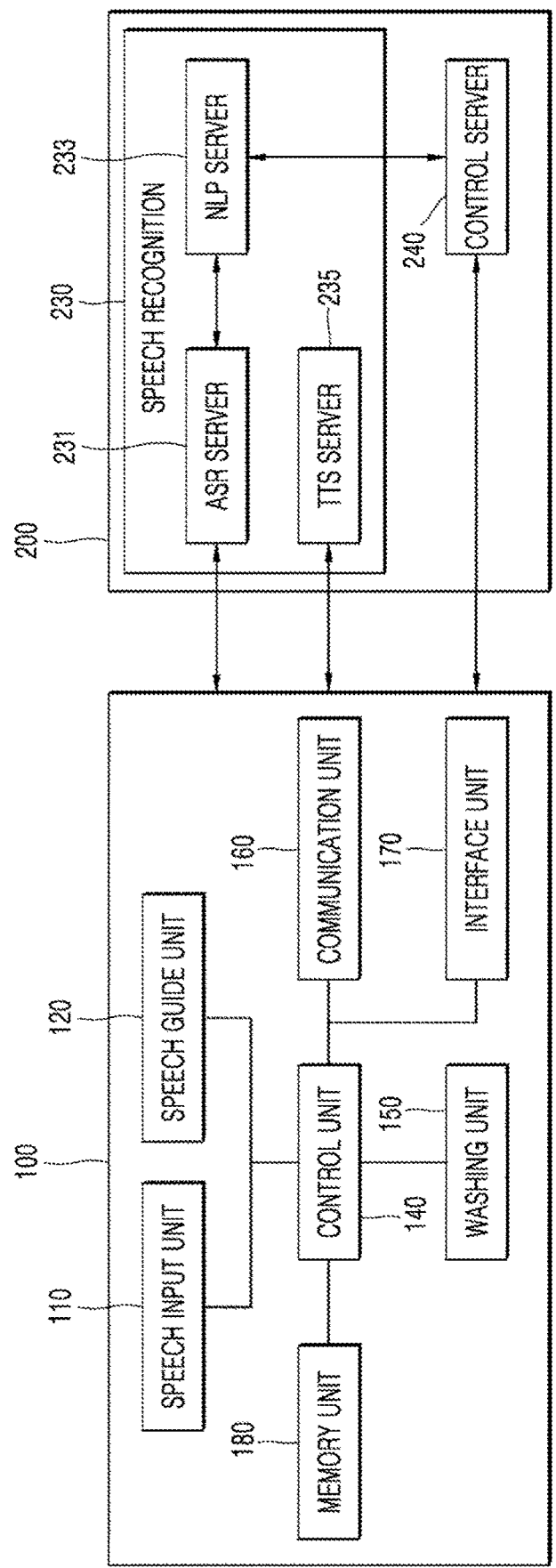
FIG. 6 is a block diagram of a relationship between a washing machine and a speech recognition server system according to another implementation of the present disclosure.

FIG. 5 shows a speech recognition server system that controls a washing machine according to another implementation of the present disclosure. FIG. 6 is a block diagram of a relationship between a washing machine and a speech recognition server system according to another implementation of the present disclosure.

Referring to FIGS. 5 and 6, according to another implementation of the present disclosure, a washing machine 100 includes a speech input unit 110, a speech guide unit 120, a control unit 140, a washing unit 150, a communication unit 160, an interface unit 170, and a memory unit 180.

One or more of the components described with reference to FIG. 6 may be implemented by at least one processor that is operably connected to at least one computer memory storing instructions that perform various operations described herein when executed by the at least one processor.

Each component the washing machine 100 includes according to another embodiment of the present invention may operate substantially in the same manner as each component the washing machine 100 includes according to the embodiment of the present invention described with reference to FIG. 4. Hereinafter, the contents overlapping with the description with reference to FIG. 4 will be omitted and the differences will be mainly described.

A speech recognition server system 200 may exchange data with the washing machine 100 through a wireless communication network. Further, the speech recognition server system 200 may control an operation of the washing machine 100.

The speech recognition server system 200 includes a speech recognition server 230 and a control server 240.

The speech recognition server 230 may include an ASR server 231, an NLP server 233, and a TTS server 235. The speech recognition server 230 may operate substantially in the same manner as the speech recognition module 130 the washing machine 100 includes according to the above-mentioned embodiment.

Specifically, the ASR server 231 may receive speech data generated by a speech input unit 110 through a communication unit 160. The ASR server 231 may convert received speech data into text data. The ASR server 231 may be variously expressed as a natural language recognition server or a speech recognition server, and the like. The ASR server 231 can use various techniques and algorithms for converting speech data into text data. Converted text data may be transmitted to the NLP server 233.

The NLP server 233 can process a natural language in which a person routinely uses according to a natural language processing algorithm, and can analyze an intention of the user. That is, the NLP server 233 can perform a natural language processing on the text data received from the ASR server 231 to determine a speech command that meets with the intention of the user. At this time, the NLP server 233 may be variously expressed as an intention analysis server, a natural language processing server, or a complex sentence recognition server, and the like. The NLP server 233 may use various techniques and algorithms for determining the intention of the user.

At this time, the NLP server 233 analyzes text data received from the ASR server 231 and extracts one or more keywords for the speech command. Here, the keyword includes the above-mentioned cloth-word and stain-word.

Then, the NLP server 233 determines a laundry course corresponding to or related to the extracted cloth-word and stain-word. Similarly, a method for determining the laundry course by the NLP server 233 will be described in detail with reference to FIG. 8.

Further, the NLP server 233 determines whether the extracted cloth-word is in the plural or not. Then, when the extracted cloth-word is in the plural, the NLP server 233 determines whether separate washing courses are needed or not. The determined result may be transmitted to the control server 240. As mentioned above, the description thereof will be described in detail with reference to FIGS. 9 and 10 below.

Additionally, the NLP server 233 may communicate with an external service server 500. For example, if a speech command of the user is a command that requests information such as the weather, the stock, the news, and the like, the NLP server 233 can request the related information to a server that provides corresponding service. Information received from the external service server 500 to the NLP server 233 may be transmitted to the washing machine 100 or the control server 240.

The TTS server 235 converts text into speech data. The TTS server 235 may be variously expressed as a speech synthesis server or a speech conversion server, and the like. The TTS server 235 may use various techniques and algorithms for converting the text to speech data. The TTS unit 135 may transmit the converted speech data to the speech guide unit 120 of the washing machine 100 through the communication unit 160. At this time, the text that the TTS server 235 receives may include the above-mentioned guide speech. The TTS server 235 can receive the guide speech from the washing machine 100.

The control server 240 can control an operation of a washing machine 100 based on a laundry course determined by an NLP server 233.

Further, the control server 240 may extract the washing tip information on the stain-word from a pre-stored database (not shown). Extracted washing tip information can be transmitted to the washing machine 100 in the form of guide speech.

At this time, the guide speech can be transmitted to the washing machine 100 through the speech recognition server 230. Further, the guide speech can be transmitted directly to the washing machine 100 from the control server 240.

For reference, the speech recognition server 230 and the control server 240 may perform the machine learning on received speech data and a laundry course. Algorithms and data, and the like, used for machine learning can be stored in each server and can be used. As the description of the machine learning has been described above, a detailed description will be omitted here.

Meanwhile, unlike the washing machine 100 according to the embodiment of the present invention, the control unit 140 of the washing machine 100 according to another embodiment of the present invention may perform only an overall control operation of the components the washing machine 100 includes.

For example, the control unit 140 may control the operation of each component of the washing machine 100 based on a control signal received from the control server 240. Further, the control unit 140 may transmit the speech data received from a speech input unit 110 to the ASR server 231 through the communication unit 160. Further, the control unit 140 can transmit the guide speech received from the communication unit 160 to a speech guide unit 120. Further, the control unit 140 can notify the user of the operation state of the washing machine 100 through an interface unit 170.

In summary, as described above with reference to FIG. 4, all of the above-mentioned speech recognition control operations of the present invention can be performed by the washing machine 100.

Meanwhile, as described with reference to FIGS. 5 and 6, all or a part of the above-mentioned speech recognition control operation of the present invention may be performed by a separate server (i.e., the speech recognition server 230 or the control server 240). A method of controlling speech recognition performed in each embodiment may be substantially the same.

Hereinafter, for convenience of explanation, the speech recognition control method according to some embodiments of the present invention will be described based on the embodiment including the speech recognition server 230 and the control server 240 shown in FIGS. 5 and 6.

However, the operations of the speech recognition server 230 and the control server 240 may be performed substantially in the same manner as the speech recognition module 130 and the control unit 140 according to the embodiment in FIG. 4, respectively.

Figure 7:
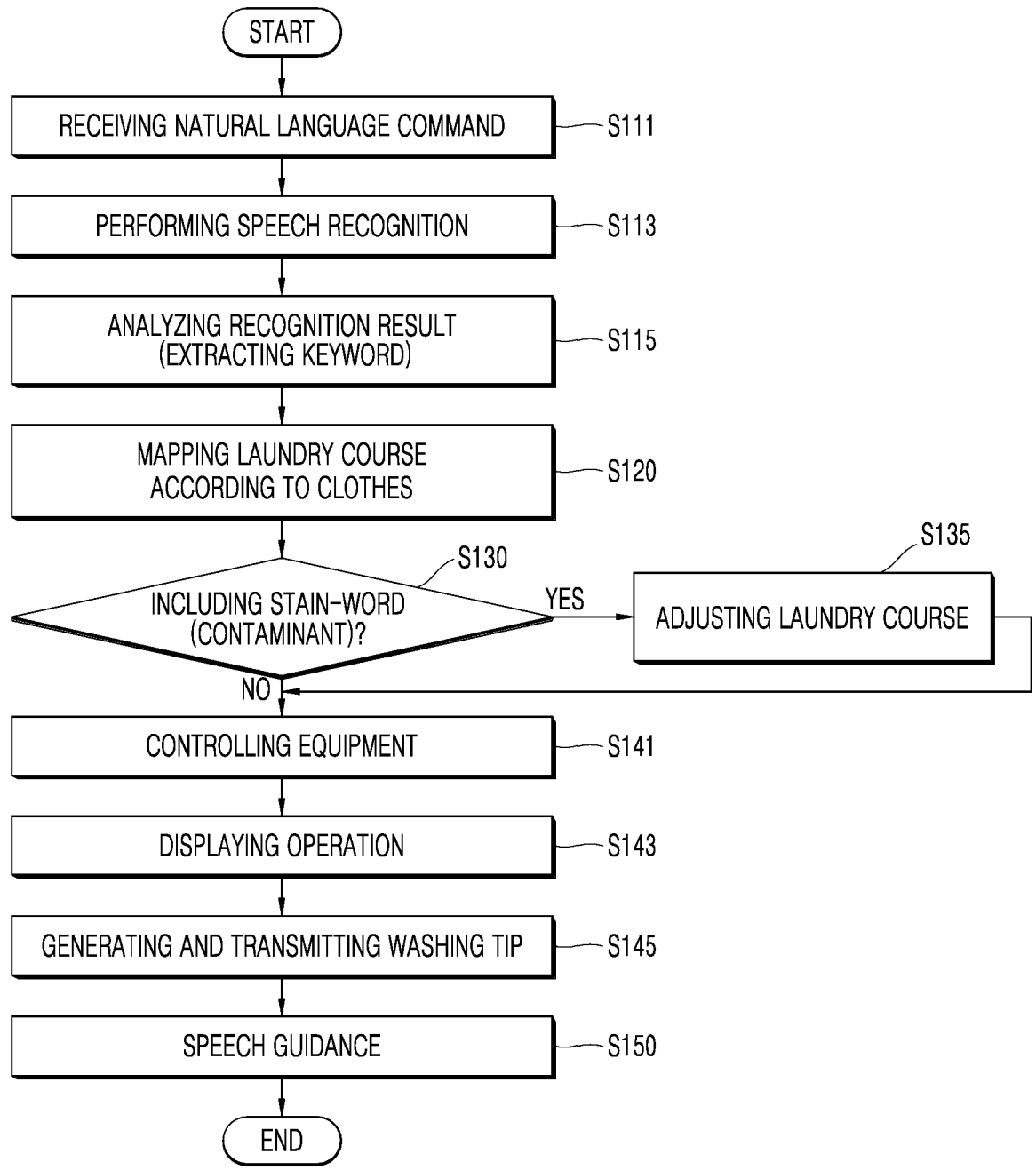
FIG. 7 is a flowchart of a method of controlling speech recognition according to an implementation of the present disclosure.

FIG. 7 is a flowchart of a method of controlling speech recognition according to an implementation of the present disclosure.

Referring to FIG. 7, according to an implementation of the present disclosure in a method of controlling speech recognition, a washing machine 100 receives a natural language command from a user (S111). The washing machine 100 receives speech data of the user including the natural language command through a speech input unit 110. The speech data may be transmitted to an ASR server 231 via a communication unit 160.

Then, the ASR server 231 performs a speech recognition operation on received speech data (S113). The ASR server 231 converts the received speech data into text data. Converted text data is transmitted to the NLP server 233.

Then, the NLP server 233 analyzes the result of a speech recognition operation performed by the ASR server 231 (S115). That is, the NLP server 233 extracts one or more keywords for a speech command from received text data. Here, the extracted keywords may include a cloth-word and a stain-word.

Then, the NLP server 233 determines a laundry course mapped with the extracted cloth-word (S120). The NLP server 233 can determine the laundry course in consideration of the cloth-word using the pre-stored database.

Then, the NLP server 233 may determine whether the extracted keyword includes the stain-word (i.e., a contaminant) or not.

If the extracted keyword includes the stain-word, the NLP server 233 can change at least one of cycles in the laundry course determined based on the pre-stored database (S135). That is, the NLP server 233 can adjust the laundry course by reflecting an additional washing option with respect to the stain-word.

Here, the additional washing option may include a combination of at least one of washing strength, the number of rinsing, strength of dehydration, a water temperature, a type of detergent, an amount of the detergent, or strength for removing contaminant from laundry.

Then, the NLP server 233 can transmit the adjusted laundry course to a control server 240. Additionally, the NLP server 233 may transmit the extracted keywords (i.e., the cloth-word and the stain-word) to a control server 240 in the laundry course.

Then, the control server 240 controls the operation of the washing machine 100 based on the received laundry course (S141). For example, the control server 240 may transmit a control command to the washing machine 100, which configures the received laundry course as the operation course of the washing machine 100.

Then, the washing machine 100 displays the configured laundry course on an interface unit 170 (S143). Then, the control server 240 can receive the configuration result of the washing machine 100.

Then, the control server 240 may generate guide speech including information on the laundry course and washing tip information based on the extracted keyword (that is, the cloth-word and the stain-word) (S145). At this time, the guide speech may include a description of the laundry course determined depending on the type of clothes, and a washing method for removing a contaminant associated with the stain-word.

Here, laundry course information matching with the cloth-word (that is, the clothes of the laundry) is shown in the following table.

TABLE 1

| Laundry course | Description |
| --- | --- |
| Standard | It is a course to do a general washing. |
| Lingerie/Wool | It is a course to wash delicate clothing such as wool and underwear that are easy to shrink or deform. I recommend the use of a neutral detergent or an exclusive detergent. |
| Simple boiling | It is a course for boiling washing for sterilization and bleaching of cotton underwear, baby clothes, and the like. |
| Small amount boiling | It is a course for boiling washing for sterilization and bleaching of clothing of 3 kg or less. |
| Baby clothes | It is a course to hygienically wash baby clothes. |

TABLE 1-continued

| Laundry course | Description |
|---|---|
| Cotton underwear | It is a course to simply wash underwear of cotton material. |
| Blanket | It is a course to wash a normal blanket or a blanket with hand wash mark. |

Table 1 shows a detailed description of each laundry course determined depending on a type of clothes of laundry. The contents of Table 1 can be stored in the control server 240 in the form of a database and can be used. For reference, the contents of Table 1 show only a part of available laundry courses as an example, and the present invention is not limited thereto.

Additionally, guide speech may further include information on a laundry option added to a standard course. The information on laundry options is shown in the following table.

TABLE 2

| Laundry option | Description |
|---|---|
| Washing | It is an option selected when changing the washing method. |
| Rinsing | It is an option selected when changing the number of rinsing. |
| Dehydration | It is an option selected when changing the intensity of the dehydration. |
| Reservation | It is an option to allow the washing to be finished at the desired time. |
| Lock buttons | It is an option used to prevent accidents due to the button operation by children during washing. |
| Smart care | Use it when you want to automatically configure the right options based on the frequently used option and weather information. Weather information is not reflected when Wi-Fi is not connected. |
| Tub sterilization | It is an option that sterilizes the germs generated inside the washing machine and maintains a clean washing tub. |
| Add laundry | It is an option to additionally input laundry or remove foreign matter during the operation of the washing machine. |
| Steam | It is an option to wash old stains or sterilize underwear. |

Table 2 shows a detailed description of each washing option added depending on a kind of contaminant on laundry. The contents of Table 2 can be stored in the control server 240 in the form of a database and can be used. For reference, the contents of Table 2 show only a part of available washing options as an example, and the present invention is not limited thereto.

Further, washing tip information matching with a stain-word (i.e., a contaminant on laundry) is shown in the following table.

TABLE 3

| Stain | Description |
|---|---|
| Ball-point pen | To remove a stain of ball-point pen cleanly, I recommend a washing after rubbing regions of stain by utilizing special liquid detergent, for example, chemicals containing ethanol. |
| Crayon | To remove crayon cleanly, I recommend a washing after smearing baking soda on a wet towel and then rubbing and washing the crayon with the wet towel many times. |
| Muddy water | To remove muddy stain cleanly, I recommend a washing after drying the muddy stain well and rubbing |

TABLE 3-continued

| Stain | Description |
|---|---|
| | it with one's hands to dust the dried muddy stain, and wiping the remaining muddy stain out with bread as a kind of eraser. |
| Kimchi liquid | Most of Kimchi liquid stain is cleanly removed after applying onion juice on the stain, and doing the washing the next day after leaving the stain applied with the onion juice for one day. |
| Curry | In a case of curry, please do a washing after mixing baking soda, oxygen based bleach with water at a 1:1 ratio in a thick concentration, and then applying the mixture on the stain and leaving the stain for one day. |
| Beer and wine | In a case of beer or wine, I recommend a method of washing beer or wine with water in which water, alcohol, and vinegar are mixed at an 8:1:1 ratio. |
| Black tea and coffee | In a case of coffee or black tea, I recommend a method of mixing kitchen detergent and vinegar at a 1:1 ratio and putting it on a toothbrush to wipe the stain off. |
| Blood | I recommend a method of rinsing the blood-stained clothes with cold water after grinding white radish and putting the grinded white radish on the stain. |
| Lipstick | In a case of lipstick stain, I recommend a method of putting the dried cotton wet with olive oil on the stain and washing the stain with soapy water. |

Table 3 shows washing tip information on an efficient washing method for a contaminant on laundry. The contents of Table 3 can be stored in a control server 240 in the form of a database and can be used. For reference, the contents of Table 3 show only a part of available washing tip information as an example, and the present invention is not limited thereto.

Then, the control server 240 transmits generated guide speech to the washing machine 100. For reference, the guide speech may be transmitted to the washing machine 100 through a speech recognition server 230 or directly transmitted to the washing machine 100 from the control server 240.

Then, the washing machine 100 may convert the received guide speech into sound and output the converted sound (S150). As a result, the user can be notified of the laundry course information on the cloth-word, the configuration result information of the washing machine 100, and the washing tip information on how to remove the stain relevant to the stain-word through speech.

At this time, the washing machine 100 can transmit the received guide speech to the TTS server 235. The TTS server 235 may convert the received guide speech into speech data and transmit the converted speech data to the washing machine 100 again. The washing machine 100 may convert received speech data into sound through the speech guide unit 120 and output the converted sound.

Therefore, the user can be notified of an optimum washing method for the laundry even if the user does not know well about which function the washing machine that the user wants to use provides, or which washing method is good.

That is, when the user says information on the laundry with regard to a type of clothes, a type of contaminant, a degree of contamination, and the like, through speech, the washing machine may automatically configure an optimum laundry course and provide to the user the washing tip information capable of easily removing the contaminant.

Further, according to another embodiment of the present invention, when it is determined that either one of stain-word or cloth-word is inputted, or incorrectly inputted, or further confirmation is required from the inputted speech, the washing machine 100 may output a speech guide message that requests information to be further inputted or to be corrected.

That is, the washing machine 100 may use the additional information to obtain an accurate keyword (i.e., a cloth-word and a stain-word) needed for washing from the user. Accordingly, the user can provide information on the laundry in a manner of conversing with the washing machine 100, and can be notified of an optimum washing method for the laundry.

Further, the washing machine 100 may perform a laundry course when there is an approval of the user with regard to the configured laundry course. The approval of the user can be determined through speech recognition. At this time, the washing machine 100 can perform simple speech recognition such as the approval of the user and high level of speech recognition such as a natural language processing, and the like may be performed by a speech recognition server system 200.

Figure 8:
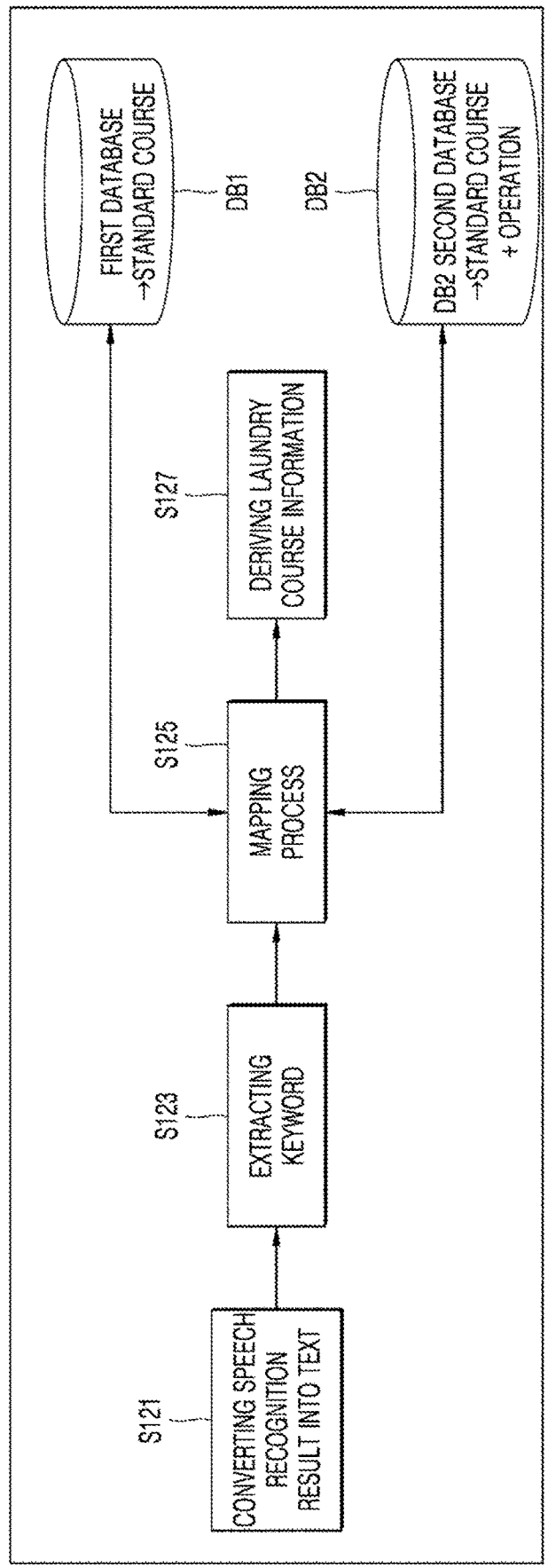
FIG. 8 is a flowchart of a method of mapping laundry course of FIG. 7.

FIG. 8 is a flowchart of a method of mapping a laundry course of FIG. 7.

Referring to FIG. 8, an NLP server 233 can determine a recommended laundry course with respect to a natural language command of a user by using a first database DB1. At this time, the plurality of standard courses pre-configured in a washing machine 100 may be stored in the first database DB1.

On the other hand, when there is no laundry course with respect to the natural language command of the user in the first database DB1, the NLP server 233 may use a second database DB2 to determine a laundry course recommended with respect to a natural language command of a user. At this time, a plurality of laundry courses which are obtained by changing one or more optional configurations in the plurality of standard courses may be stored in the second database DB2.

Specifically, an ASR server 231 receives a natural language command of a user from a washing machine 100 and performs a speech recognition operation. As a result, the result of the speech recognition operation is converted into text (S121).

Subsequently, the NLP server 233 extracts a keyword from the result of the speech recognition (S123). Here, the keyword may include the above-mentioned cloth-word and stain-word.

Then, the NLP server 233 determines a laundry course matching with a keyword with reference to the first database DB1 and the second database DB2.

At this time, various kinds of utterance text (i.e., a keyword combination) for the laundry course and the corresponding laundry course may be stored in the form of a table in the first database DB1 and the second database DB2.

For example, a plurality of pre-configured standard courses may be stored in the first database DB1. Further, a plurality of laundry courses which are obtained by changing one or more optional configurations in the plurality of standard courses may be stored in the second database DB2. That is, a laundry course which is obtained by adjusting an option (a rinsing, a dehydration cycle, a water temperature, and the like) of one of the standard courses may be set as a determined laundry course.

In a mapping process (step S125), the NLP server 233 may search first whether there is a laundry course matching with a keyword in the first database DB1 or not. Then, when a mapping of the keyword to the laundry course is made, the NLP server 233 determines the mapped laundry course as a recommended laundry course (S127).

On the other hand, when there is no laundry course mapped to the keyword in the first database DB1, the NLP server 233 searches whether there is a laundry course matching with the keyword in the second database DB2 or not.

On the other hand, according to the embodiment, a special laundry course specifically provided by the washing machine 100 may be stored in the first database DB1, and a plurality of laundry courses which are obtained by changing one or more configurations in general-purpose standard courses may be stored in the second laundry course table 1602.

In this case, the NLP server 233 may search for a laundry course to be determined in consideration of the extracted keyword with reference to the first database DB1 and the second database DB2 sequentially.

If there is no laundry course determined in consideration of the extracted keyword in the first database DB1 and the second database DB2, the NLP server 233 can configure one of the general-purpose standard laundry courses as the recommended laundry course.

On the other hand, a mapping conversion table with regard to a laundry course and an extracted keyword may be continuously or regularly updated. Accordingly, the user can use a new laundry course without changing default data stored in the washing machine 100.

Figure 9:
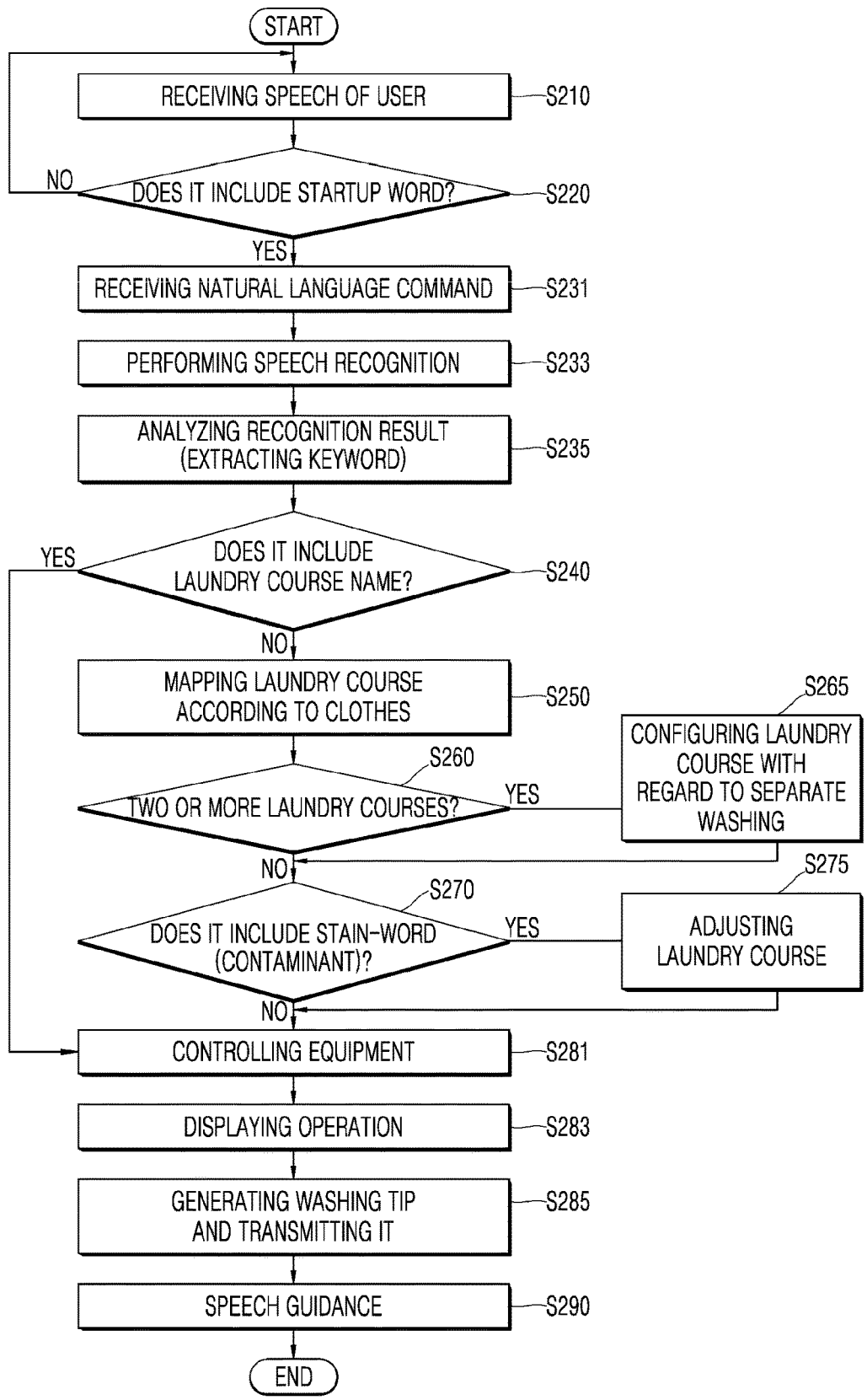
FIG. 9 is a flowchart of a method of controlling speech recognition according to another implementation of the present disclosure.

FIG. 9 is a flowchart of a method of controlling speech recognition according to another implementation of the present disclosure. FIG. 10 is a flowchart of a method of configuring a laundry course for a separate washing in step S265 of FIG. 9. In FIGS. 9 and 10, the contents overlapping with those described with reference to FIG. 7 will be omitted, and the differences will be mainly described.

Referring to FIG. 9, according to another embodiment of the present invention, in the method of controlling the speech recognition, a washing machine 100 receives speech of a user (S210). The washing machine 100 receives speech data of the user through a speech input unit 110. Inputted speech data may be transmitted to a speech recognition server system 200.

Then, the speech recognition server system 200 may determine whether inputted speech data includes a startup word or not (S220).

Here, the startup word can be configured by the manufacturer. For example, the startup word of the washing machine 100 may be "Hi, LG" or "LG tromm". At this time, the startup word can be configured in various ways.

Then, when the inputted speech data includes the startup word, the speech recognition server system 200 may control the washing machine 100 so as to receive a natural language command from the user (S231).

For reference, in another embodiment, the washing machine 100 may perform simple speech recognition (i.e., startup recognition) and high level of speech recognition such as a natural language processing, and the like, may be performed by the speech recognition server system 200.

For example, if a wake up speech signal (e.g., "LG tromm") including a pre-configured startup word is received, the washing machine 100 may be switched to a state for receiving a natural language command. In this case, the washing machine 100 may perform only a speech recognition process by a speech input or not by the startup word, and the speech recognition for the subsequent natural language command can be performed through the speech recognition server system 200. That is, since there is a limitation in the system resource of the washing machine 100, the recognition and processing of the complex natural language can be performed by the speech recognition server system 200.

For reference, the identification of the startup word can be performed by the washing machine 100 and the speech recognition server system 200 both. Accordingly, it is possible to reduce erroneous recognition in identifying a speech input of the startup word and increase a recognition rate.

Then, when the natural language command is received, an ASR server 231 performs a speech recognition operation on received speech data (S233). The ASR server 231 may convert the received speech data into text data. The converted text data may be transmitted to the NLP server 233.

Then, the NLP server 233 analyzes the result of a speech recognition operation performed by the ASR server 231 (S235). That is, the NLP server 233 may extract a keyword for a speech command from the received text data. Here, the extracted keyword may include a name of a laundry course, a cloth-word, or a stain-word.

Then, when the extracted keyword includes the name of the laundry course, the NLP server 233 transmits the name of the laundry course to a control server 240. Then, the control server 240 configures an operation mode of a washing machine 100 in a laundry course matching with the name of the laundry course.

When the user says the name of the laundry course, this means that the user already knows the correct name of the laundry course. That is, the user intends for the washing machine 100 to perform the washing operation corresponding to the name of the laundry course uttered by the user. Therefore, the control server 240 configures the operation mode of the washing machine 100 with the laundry course matching with the name of the laundry course that the user utters.

On the other hand, if the user does not know a proper name of laundry course, the user can utter a natural language command including one or more kinds of clothes or a contamination degree of the laundry. In this case, the cloth-word or the stain-word may include the natural language command uttered by the user.

Then, the NLP server 233 may determine a laundry course mapped in consideration of the extracted cloth-word (S250). The NLP server 233 may determine a laundry course in consideration of the extracted cloth-word by using a pre-stored database.

At this time, when the cloth-words are in the plural, the NLP server 233 determines one or more laundry courses in consideration of the respective cloth-words. As a method of determining the laundry course by the NLP server 233 is described in detail with reference to FIG. 8, the overlapping contents are omitted.

Then, the NLP server 233 determines whether the determined laundry course is in the plural or not (S260).

If the one or more laundry courses determined for the plurality of cloth-words are the same, the NLP server 233 determines that the laundry course to be performed is a single one. In this case, various kinds of laundry may be washed in one laundry course. Therefore, the NLP server 233 transmits only one laundry course to the control server 240.

On the other hand, when the one or more laundry courses determined for the plurality of cloth-words are different from each other, the NLP server 233 determines that the determined laundry course is in the plural. In this case, the laundry for plurality of cloth-words may be washed in different laundry courses. Therefore, the NLP server 233 may recommend a separate washing for each laundry associated with the respective cloth-words.

Then, the NLP server 233 determines a laundry course for one of the cloth-words requiring a separate washing and transmit the determined laundry course to the control server 240 (S265). At this time, the NLP server 233 identifies a cloth-word associated with laundry to be separately washed by using a database (not shown) in which information on laundry courses suitable for a small amount of washing or a separate washing is stored.

For example, the NLP server 233 recommend a separate washing generally in a case of a small amount of baby clothes, clothes having high risk of dye migration (for example, jeans), functional clothing, and clothes having a high degree of contamination, and the like.

At this time, the NLP server 233 may recommend to wash the laundry, which requires a separate washing, preferentially in a mini washer (i.e., a second washing unit 150B). Accordingly, the NLP server 233 can configure a laundry course for the laundry requiring the separate washing to the mini washer (i.e., the second washing unit 150B). Further, the NLP server 233 may generate data of guide speech with regard to the separate washing of the laundry to transmit the generated guide speech data to the washing machine 100.

Figure 10:
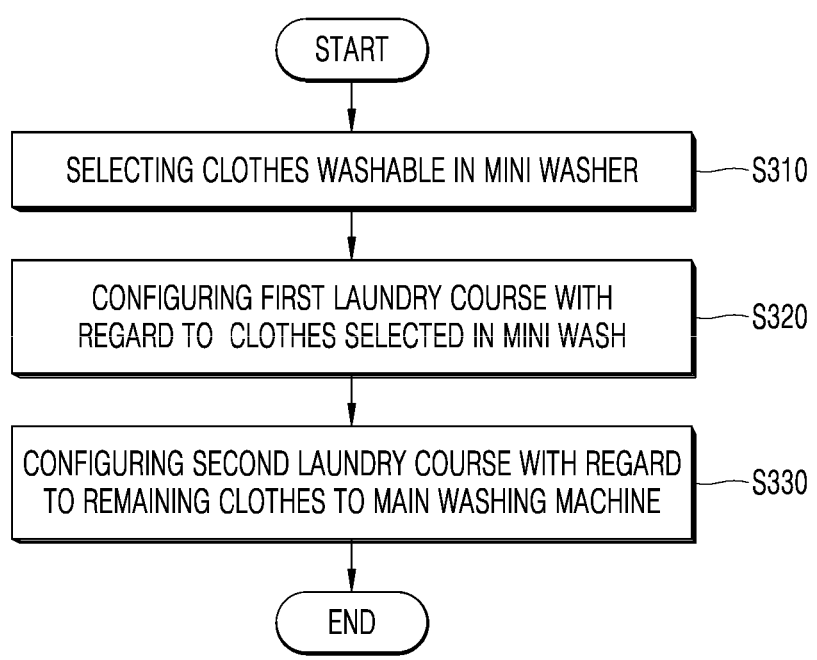
FIG. 10 is a flowchart of a method of configuring a laundry course for the separate washing in step S265 of FIG. 9.

Specifically, referring to FIG. 10, the NLP server 233 determines whether a laundry course related to a cloth-word is available in a mini washer or not (i.e., a second washing unit 150B) (S310). That is, the NLP server 233 selects a laundry course related to a cloth-word and applicable to the mini washer (i.e., the second washing unit 150B).

Here, laundry courses matching with cloth-words for a separate washing are shown in the following table.

TABLE 4

| Laundry course | Description |
| --- | --- |
| Standard (small amount) | It is a general course to wash a small amount of laundry or wash laundry possibly causing dye migration. |
| Lingerie/Wool | It is a course to wash delicate clothing such as wool and underwear that are easy to shrink or deform. I recommend the use of a neutral detergent or an exclusive detergent. |
| Small boiling | It is a course to do boiling washing for sterilization and the bleaching of clothing of 3 kg or less. |
| Baby clothes | It is a course to hygienically wash baby clothes. |
| Cotton underwear | It is a course to simply wash underwear of cotton material. |
| Small amount washing | It is a course to wash a small amount of clothes in a short time. |
| Rinsing + Dehydration | It is a course for rinsing and dehydration only, not for washing. |
| Tub sterilization | It is an option to sterilize germs generated inside the washing machine and maintains a washing tub clean. |

Table 4 shows a detailed description of laundry courses provided by a mini washer (i.e., a second washing unit 150B) for separate washing. The contents of Table 4 can be stored in an NLP server 233 in the form of a database and can be used. For reference, the contents of Table 4 are shown as examples of laundry courses provided in the mini washer, and the present invention is not limited thereto.

Then, the NLP server 233 may determine a laundry course for a selected cloth-word for the mini washer (i.e., the second washing unit 150B) (S320).

Then, the NLP server 233 may determine a laundry course for the remaining cloth-words for the main washer (i.e., the first washing unit 150A) (S330).

At this time, a laundry course for the mini washer (i.e., the second washing unit 150B) may be determined prior to the determination of a laundry course for the main washer (i.e., the first washing unit 150A).

For example, in a natural language command of "wash baby clothes and blankets together," the cloth-words are "baby clothes" and "a blanket." At this time, 'baby clothes' may be a cloth-word requiring a separate washing as they are generally small amount, so that 'baby clothes course' may be determined for the mini washer (i.e., the second washing unit 150B). Therefore, for washing of 'the blanket', which is the remaining cloth-word, 'a blanket course' can be determined for the main washer (i.e., the first washing unit 150A).

In another example, in a natural language command of "wash jeans and sportswear together", the cloth-words are "jeans" and "sportswear". At this time, 'jeans' may be a cloth-word requiring a separate washing as there is a possibility of dye migration, so that a 'standard course' may be determined for the mini washer (i.e., the second washing unit 150B). Therefore, for washing 'blankets' which is the remaining cloth-word, 'a blanket course' may be determined for the main washer (i.e., the first washing unit 150A). For reference, these examples are merely provided to help the understanding of possible embodiments, but the present invention is not limited thereto.

Additionally, the NLP server 233 may generate data of guide speech for separate laundry washing and may transmit the generated data of guide speech to the washing machine 100. The NLP server 233 can generate the guide speech data based on information on separate laundry washing pre-stored in the database.

At this time, information on separate laundry washing is shown in the following table.

TABLE 5

| Laundry | Laundry Course | Description of separate washing |
| --- | --- | --- |
| Jeans | Standard | Standard course is recommended for jeans. Please wash jeans separately from normal laundry for preventing a dye migration. |
| Climbing wear | Functional clothing | Functional clothing course is recommended for climbing clothes. Please wash the climbing clothes separately from normal laundry. |
| Windbreaker | Functional clothing | Functional clothing course is recommended for windbreaker. Please wash windbreaker separately from normal laundry. |
| Sportswear | Functional clothing | Functional clothing course is recommended for sportswear. Please wash sportswear separately from normal laundry. |
| Baby pants | Baby clothes | Baby clothes course are recommended for baby pants. Please wash baby pants separately from normal laundry to hygienically wash baby clothes. |
| Denim | Standard | Standard course is recommended for denim material. Please wash denim separately from normal laundry for preventing a dye migration. |
| Wool | Lingerie/Wool | Lingerie/wool course is recommend for wool material. To prevent damage to the clothes, please wash it separately from normal laundry. |
| Knit | Lingerie/Wool | Lingerie/wool course is recommended for knit. To prevent damage to the clothes, please wash it separately from normal laundry. Please wash knit after confirming that they can be washed by water washing. |

Table 5 shows a detailed description of laundry courses available for separate laundry washing by a mini washer. Table 5 can be stored in the NLP server 233 in the form of a database and can be used. For reference, the examples of Table 5 are a part of possible laundry courses, but the present invention is not limited thereto.

Then, the NLP server 233 may determine whether extracted keyword includes a stain-word or not (S270).

If the extracted keyword includes a stain-word, the NLP server 233 determines whether which cloth-word is associated with the stain-word.

For example, based on a position of the stain-word and the cloth-word within the natural language command, a relation between the words themselves, a distance between the words in the natural language command, and the like, the NLP server 233 may determine which cloth-word has high relevance to the stain-word.

Then, the NLP server 233 can change at least one of cycles in a determined laundry course based on pre-stored data in a database (S275). That is, the NLP server 233 may adjust a laundry course for a cloth-word determined in steps S260 and S265, by reflecting an additional washing option with respect to the stain-word. At this time, the NLP server 233 may adjust a laundry course for the cloth-word having a high degree of relevance to the stain-word.

Then, the NLP server 233 transmits an adjusted laundry course to a control server 240.

At this time, the NLP server 233 transmits a laundry course for a plurality of cloth-words determined respectively for the second washing unit 150B and the first washing unit 150A, to the control server 240. Further, the NLP server 233 may transmit the extracted keyword (i.e., the cloth-word and the stain-word) to the control server 240 with the laundry course.

Then, the control server 240 controls the operation of the washing machine 100 based on each received laundry course. At this time, the control server 240 configures each of the first and second washing units 150A, 150B with the laundry courses determined by the NLP server 233.

For example, the control server 240 may transmit a control command that sets each received laundry course as an operation course of the first and second washing units 150A and 150B of the washing machine 100.

Then, the washing machine 100 displays the set laundry course to an interface unit 170 (S283). Then, the control server 200 may receive the result of configuring the washing machine 100.

Then, the control server 240 generates data of guide speech including a laundry course and washing tip information based on the extracted keyword (i.e., the cloth-word and the stain-word). At this time, the data of guide speech may include a description of a laundry course matching with an extracted cloth-word, a washing method matching with an extracted stain-word.

Then, the control server 240 transmits the generated data of guide speech to the washing machine 100. For reference, the data of guide speech may be transmitted to the washing machine 100 through the speech recognition server 230 or may be directly transmitted to the washing machine 100 from the control server 240.

Then, the washing machine 100 converts the received data of guide speech into sound and output the converted sound (S290). At this time, the received data of guide speech may include information on a laundry course, a washing method for contaminant received from the control server 240, and also information on separation laundry washing received from the NLP server 233.

At this time, the washing machine 100 can transmit the received data of guide speech to the TTS server 235. The TTS server 235 may convert the received data of guide speech into speech data and transmit the converted speech data to the washing machine 100 again. The washing machine 100 may convert the received speech data into sound through the speech guide unit 120 and output the converted sound.

Further, the washing machine 100 may perform the laundry course if there is an approval of the user with regard to the laundry course received and set for one of the first and second washing unit 150A, 150B. The approval by the user can be determined through speech recognition. At this time, the washing machine 100 can perform simple speech recognition for the user approval, and a high level of speech recognition such as the natural language processing, and the like, can be performed in the speech recognition server system 200.

As a result, the user can be notified of information on whether a separate laundry washing is necessary when a plurality of cloth-words are considered, information on a laundry course determined for each washing unit 150A, 150B, information on a separate washing method, and washing tip information related to one or more stain-words through speech.

Accordingly, the user can be notified of an optimum washing method for a lot of laundry requiring a separate washing. Further, as a laundry course for the laundry requiring the separate washing is automatically set for the mini washer (i.e., the second washing unit 150B), it is possible to perform the washing by the predetermined optimum washing method regardless of knowledge or experiences of the user.

Hereinafter, for example, some embodiments of a method of controlling speech recognition of the present invention will be described.

Figure 11:
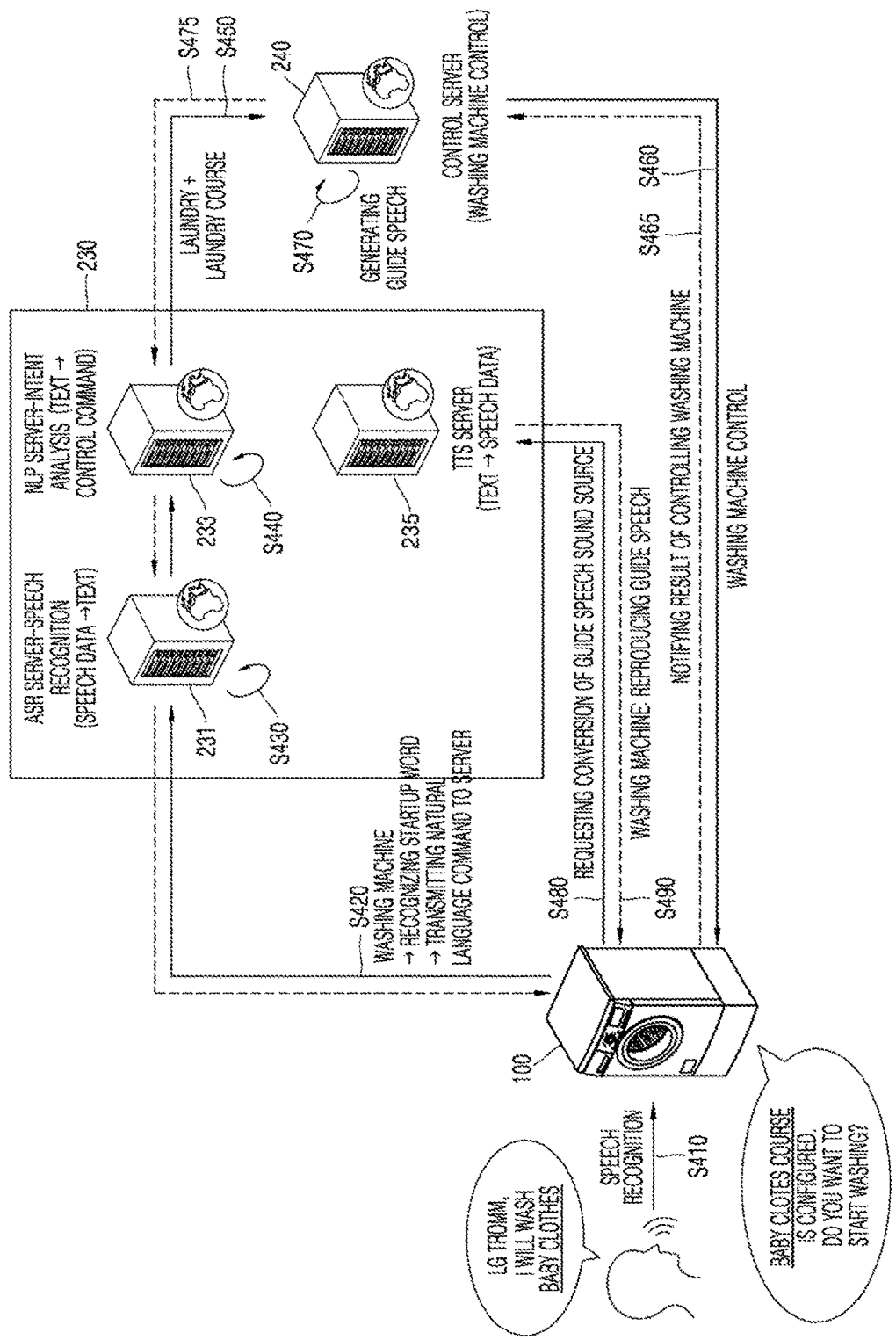
FIG. 11 is a schematic view of a first embodiment of a method of controlling speech recognition of the present disclosure.

FIG. 11 is a schematic view of a first embodiment of a method of controlling speech recognition according to the present disclosure.

Referring to FIG. 11, a washing machine 100 may receive speech of a user first (S410). The washing machine 100 receives speech data of the user by a speech input unit 110. Hereinafter, the case where the user utters "LG tromm, I will wash baby clothes" will be described as an example of a method of controlling speech recognition.

The washing machine 100 can recognize a startup word from the speech data of the user. Here, the startup word may be "LG tromm".

For reference, as mentioned above, an operation of recognizing the startup word can be performed by a speech recognition server system 200. Hereinafter, for convenience of explanation, for example, the washing machine 100 is regarded as to recognize the startup word.

Then, when the startup word is recognized, the washing machine 100 can process the contents that the user utters in a natural language command.

Then, the speech data with respect to the natural language command may be transmitted to the speech recognition server system 200 (S420). At this time, the natural language command may include speech data of "I will wash baby clothes".

Then, when the natural language command is received, an ASR server 231 performs a speech recognition operation with the received speech data (S430). The ASR server 231 may convert the received speech data into text data. The converted text data may be transmitted to an NLP server 233.

Then, the NLP server 233 analyzes a result of the speech recognition operation performed by the ASR server 231 (S440). That is, the NLP server 233 extracts a keyword of a speech command from the received text data. Here, a keyword extracted from the natural language command can be 'baby clothes'. The NLP server 233 selects 'baby clothes' as a cloth-word by referring to a database.

Then, the NLP server 233 can determine a laundry course in consideration of the cloth-word based on the above-mentioned database shown in Table 1. For example, the laundry course determined for 'baby clothes' may be the 'baby clothes course'.

Then, as the NLP server 233 has determined a laundry course (i.e., a 'baby clothes course'), it transmits the determined laundry course (i.e., 'baby clothes course) and the cloth-word (i.e., 'baby clothes) with respect to the laundry course to a control server 240 (S450).

Then, the control server 240 configures the washing machine 100 with the received laundry course (i.e., 'baby clothes course') (S460).

Then, the control server 240 receives a result of the configuration of the washing machine 100 (S465).

Then, the control server 240 generates data of guide speech with regard to the configuration result of the washing machine 100 (S470). For example, the guide speech about the configuration result of the washing machine 100 may be "the baby clothes course can be used. Do you want to start the washing?" However, this is only one example, and this guide speech can be variously modified and implemented.

Then, the control server 240 transmits the generated data of guide speech to a washing machine 100 through a speech recognition server system 200 (S475). For reference, in another embodiment, the control server 240 may transmit the generated data of guide speech to the washing machine 100 directly.

Then, the washing machine 100 transmits the received data of guide speech to a TTS server 235 (S480).

Then, the TTS server 235 may convert the received data of guide speech into speech data and transmit the converted speech data to the washing machine 100 again (S490). The washing machine 100 may convert the received speech data into speech (i.e. sound) through a speech guide unit 120 and output the converted speech. In other words, the washing machine 100 can output the guide speech of "The baby clothes course can be used. Do you want to start the washing?" through speech.

Therefore, the user can be notified of an optimum washing method for laundry even if the user does not know well which laundry courses or functions the washing machine that the user wants to use provides, or which washing method is appropriate for laundry to be washed.

Figure 12:
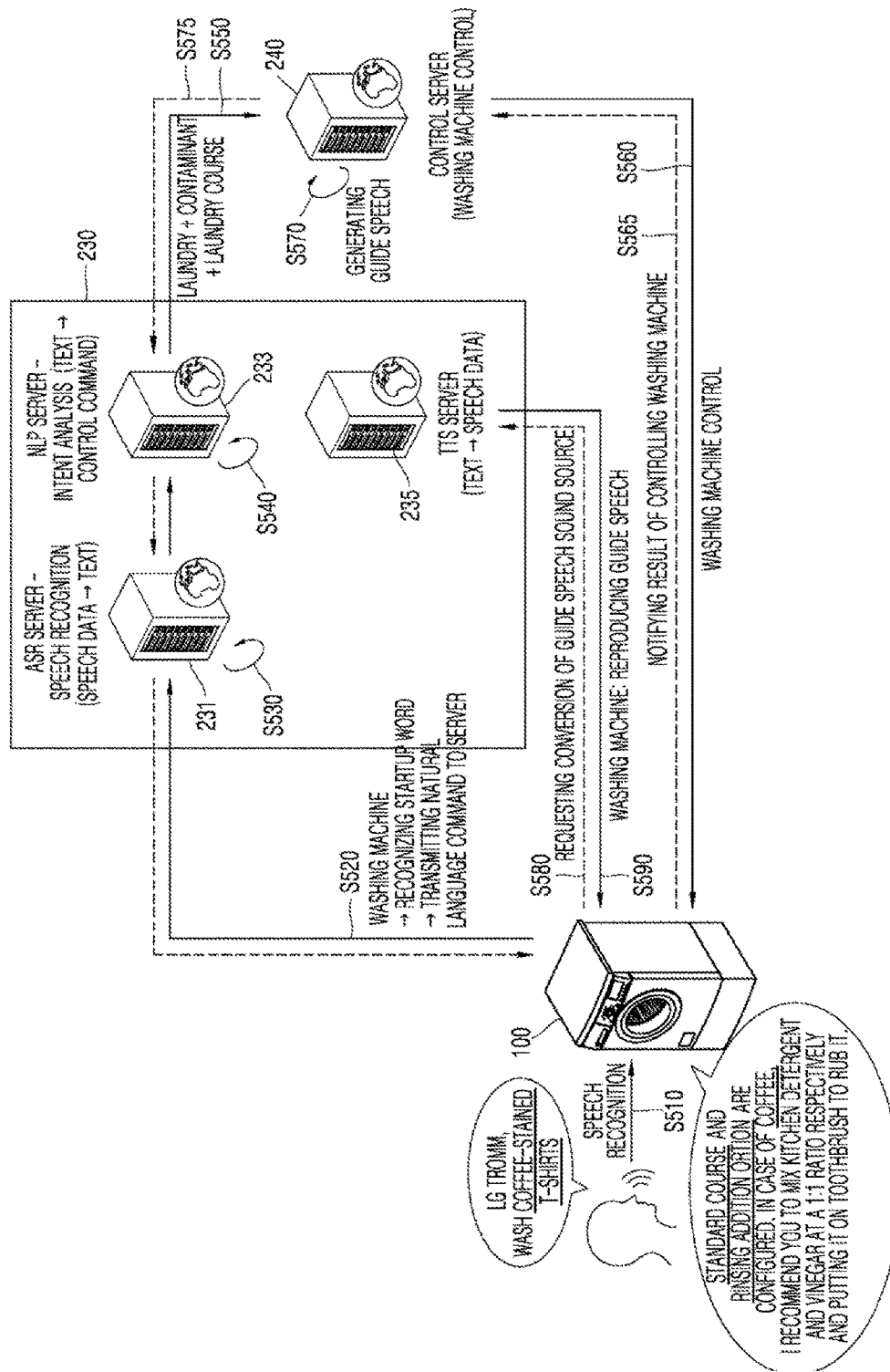
FIG. 12 is a schematic view of a second embodiment of a method of controlling speech recognition of the present disclosure.

FIG. 12 is a schematic view of a second embodiment of a speech recognition control method of the present disclosure. Hereinafter, the contents overlapping with the above embodiment will be omitted, and the difference will be mainly described.

Referring to FIG. 12, a washing machine 100 receives speech of a user first (S510). Hereinafter, the case where a user utters "LG tromm, wash T-shirts stained with coffee" will be described as a method of controlling speech recognition of the present invention.

The washing machine 100 can recognize the startup word from speech data of the user. Here, the startup word may be "LG tromm".

Then, when the startup word is recognized, the washing machine 100 can process the contents that the user utters in a natural language command. Here, the natural language command can be "wash T-shirts stained with coffee".

Then, the speech data with respect to the natural language command may be transmitted to a speech recognition server system 200 (S520).

Then, when the natural language command is received, an ASR server 231 converts the received speech data into text data and transmits the converted text data to an NLP server 233 (S530).

Then, the NLP server 233 extracts one or more keywords for a speech command from received text data. Here, the extracted keywords may be 'coffee' and 'T-shirts'.

Then, the NLP server 233 can select 'Coffee' as a stain-word and can select 'T-shirt' as a cloth-word.

Then, the NLP server 233 determines a laundry course in consideration of the cloth-word. For example, the laundry course determined in consideration of 'T-shirts' may be a 'standard course'.

Then, as the extracted keyword includes a stain-word, the NLP server 233 can adjust the determined laundry course by reflecting an additional washing option with respect to the stain-word (i.e., 'coffee').

For example, the NLP server 233 can adjust the laundry course by increasing the number of rinsing. However, this is only one example, and the laundry course may be variously modified and adjusted.

Then, as the NLP server 233 has determined one laundry course (i.e., an adjusted 'standard course'), it transmits the determined laundry course, a washing option of which has been adjusted (i.e., the adjusted 'standard course'), with the cloth-word (i.e., 'T-shirt') and the stain-word (i.e., 'coffee') related with the determined laundry course, to a control server 240 (S550).

Then, the control server 240 configures the washing machine 100 with the received laundry course (i.e., the adjusted 'standard course') (S560).

Then, the control server 240 receives a result of the configuration of the washing machine 100 (S565).

Then, the control server 240 generates data of guide speech about the configuration result of the washing machine 100 (S570). For example, the data of guide speech about the configuration result of the washing machine 100 may be "a standard course with an option to add one time of rinsing has been set".

Further, the control server 240 may generate data of guide speech including washing tip information for the stain-word (i.e., 'coffee') based on the above-mentioned database of Table 3. For example, the data of guide speech for the washing tip information may be "in case of stains of coffee, I recommend a method of mixing a kitchen detergent with vinegar in a ratio of 1:1, putting the mixed kitchen detergent and vinegar on a toothbrush and rubbing the stains with the toothbrush". However, this is only one example, and the guide speech can be variously modified and implemented.

Then, the control server 240 can transmit the generated data of guide speech to the washing machine 100 through a speech recognition server system 200 (S575).

Then, the washing machine 100 transmits the received data of guide speech to a TTS server 235 (S580). Then, the TTS server 235 may convert the received data of guide speech into speech data and transmit the converted speech data to the washing machine 100 again (S590).

The washing machine 100 may convert the received speech data into speech (i.e., sound) through a speech guide unit 120 and output the converted speech (i.e., sound). That is, the washing machine 100 may output guide speech of "a standard course with one time of rinsing added can be used" and "in case of stains of coffee, I recommend the method of mixing a kitchen detergent and vinegar in a 1:1 ratio, putting the mixed kitchen detergent and vinegar on a toothbrush and rubbing the stain with the toothbrush" by speech.

In summary, the washing machine 100 can notify the user of information on which laundry course is used to wash the laundry by uttering the information related to the laundry and the contaminant. Further, the washing machine 100 can notify the user of a washing method capable of effectively removing the contaminant. As a result, even if the user does not know well about which laundry course the washing machine 100 provides, the user can perform washing with a laundry course optimally determined for the laundry to be washed.

Figure 13:
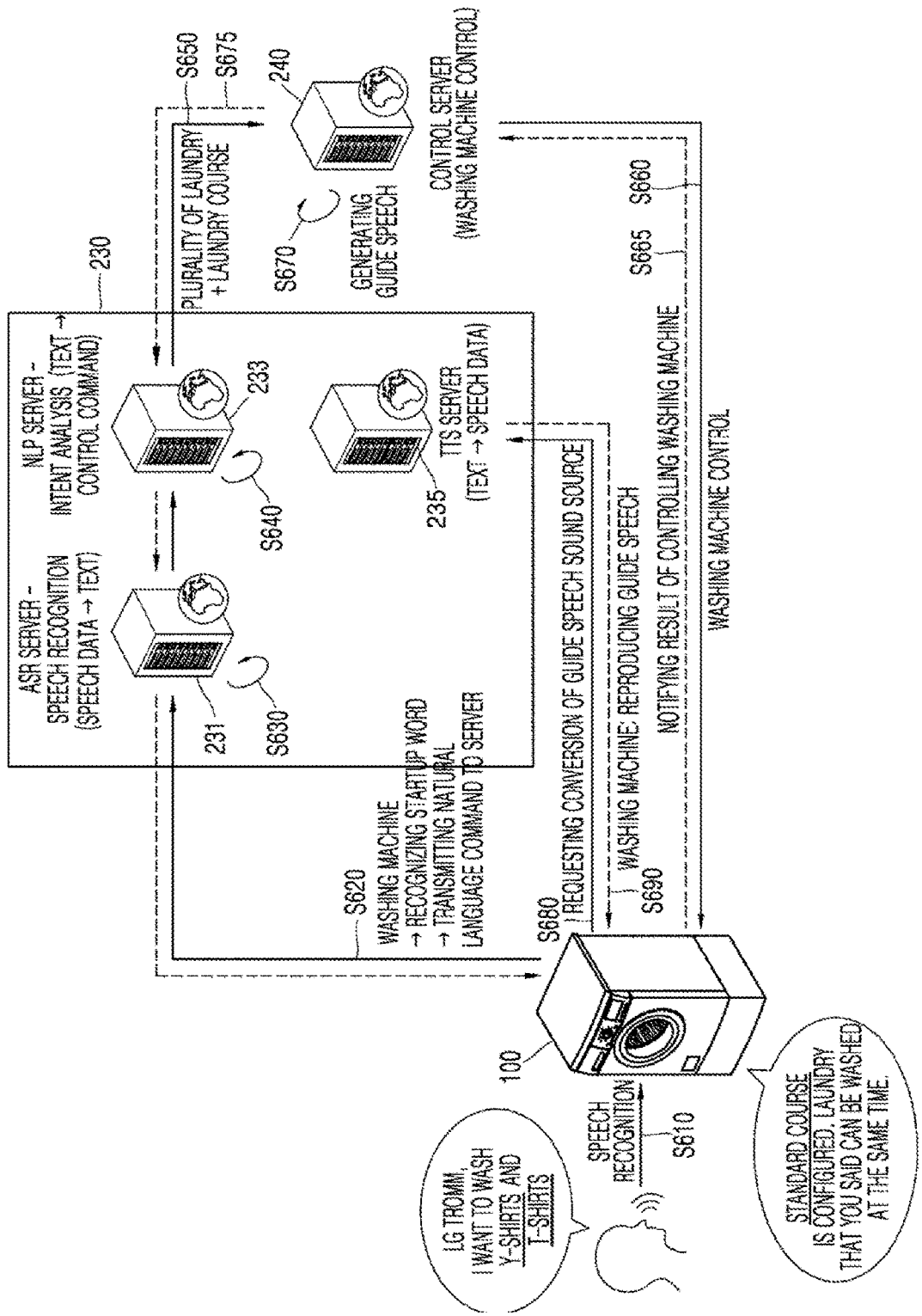
FIG. 13 is a schematic view of a third embodiment of a method of controlling speech recognition of the present disclosure.

FIG. 13 is a schematic view of a third embodiment of a method of controlling speech recognition of the present invention. Hereinafter, the contents overlapping with the above embodiment will be omitted, and the differences will be mainly described.

Referring to FIG. 13, the washing machine 100 receives speech of a user first (S610). Hereinafter, the case where the user utters "LG Tromm, I want to wash Y-shirts and T-shirts" will be described as an example of a method of controlling speech recognition of the present invention.

The washing machine 100 can recognize a startup word from speech data of the user. Here, the startup word may be "LG tromm".

Then, when the startup word is recognized, the washing machine 100 can process the contents that the user utters later in a natural language command. Here, the natural language command can be "I want to wash Y-shirts and T-shirts".

Then, speech data with respect to the natural language command may be transmitted to a speech recognition server system 200 (S620).

Then, when the natural language command is received, an ASR server 231 converts received speech data into text data and may transmit the converted text data to an NLP server 233 (S630).

Then, the NLP server 233 may extract one or more keywords for a speech command from the received text data. Here, the extracted keywords may be 'Y-shirts' and 'T-shirts'.

Then, the NLP server 233 selects 'Y-shirts' and 'T-shirts' as the cloth-words. At this time, the extracted keyword includes a plurality of cloth-words.

Then, the NLP server 233 determines one or more laundry courses corresponding to the plurality of cloth-words, respectively. For example, the determined laundry courses with respect to 'Y-shirts' and 'T-shirts' can be 'standard course'. That is, the respective laundry course determined in consideration of each of the plurality of cloth-words may be the same one.

Then, as there is one determined laundry course (that is, 'standard course'), the NLP server 233 transmits the information of laundry course (i.e., 'standard course) and the plurality of cloth-words related to the laundry course (i.e., 'Y-shirts' and 'T-shirts') to a control server 240 (S650).

Additionally, the NLP server 233 may generate guide speech information that the laundry corresponding to the plurality of cloth-words inputted are simultaneously washable, and provide the generated guide speech information to the washing machine 100. For example, the NLP server 233 can generate data of guide speech of "the laundry that you want to wash can be washed at the same time" and transmit it to the washing machine 100.

Then, the control server 240 may configure the washing machine 100 with the received laundry course (i.e., 'standard course') (S660).

Then, the control server 240 may receive a result of the configuration of the washing machine 100 (S665). Then, the control server 240 may generate data of guide speech on the configuration result of the washing machine 100 (S670). For example, the data of guide speech on the configuration result of the washing machine 100 may be "the standard course has been set".

Then, the control server 240 may transmit the generated data of guide speech to the washing machine 100 through the speech recognition server system 200 (S675).

Then, the washing machine 100 transmits the received data of guide speech to a TTS server 235 (S680). For example, the washing machine 100 can transmit to the TTS server 235 both the data of guide speech on the simultaneous washability received from the NLP server 233 and the data of guide speech on the configuration result of the washing machine 100 received from the control server 240.

Then, the TTS server 235 may convert the received data of guide speech into speech data and transmit the converted speech data to the washing machine 100 again (S690).

The washing machine 100 may convert the received speech data into speech (i.e., sound) through a speech guide unit 120 and output the converted speech (i.e., sound). That is, the washing machine 100 can output guide speech of "the standard course can be" and "the laundry that you want to wash can be washed at the same time" through speech.

Additionally, the NLP server 233 may select any one of the plurality of washing units 150A and 150B that the washing machine 100 includes, configure the selected one with the laundry course (i.e., 'standard course'), and provide data of guide speech about the selected washing unit and the laundry course to the washing machine 100.

For example, the NLP server 233 can provide data of guide speech of "the main washing machine can be configured with the standard course. As the laundry that you want to wash can be washed by the same laundry course, please put the laundry into the main washing machine". However, this is only one example, and the present invention is not limited to this example.

In summary, the washing machine can notify, by sound, the user of whether a separate washing for plural kinds of laundry is necessary. As a result, the present invention enables preventing the problem of dye migration or spreading of contamination among the laundry when the laundry is washed at the same time. Further, even if the user does not know which laundry courses the washing machine 100 provides, it is possible to perform the washing with an optimum laundry course suitable for various kinds of laundry.

Figure 14:
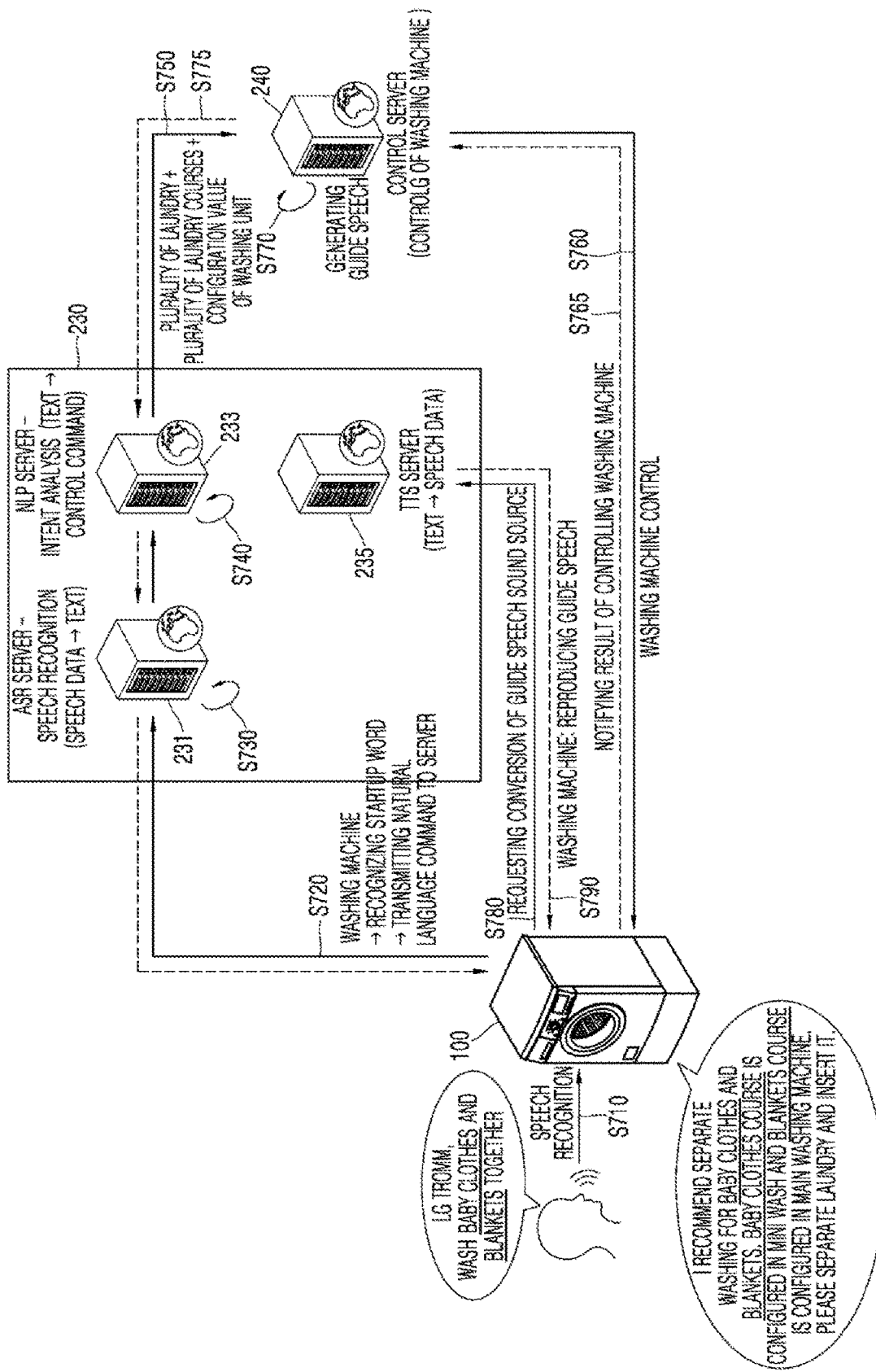
FIG. 14 is a schematic view of a fourth embodiment of a method of controlling speech recognition of the present disclosure.

FIG. 14 is a schematic view of a fourth embodiment of a method of controlling speech recognition of the present disclosure. Hereinafter, the contents overlapping with the above embodiment will be omitted and the differences will be mainly described.

Referring to FIG. 14, the washing machine 100 receives speech of a user first (S710). Hereinafter, a case in which the user utters "LG tromm, wash baby clothes and blanket together" will be described as an example of a method of controlling speech recognition of the present invention.

The washing machine 100 can recognize a startup word from speech data of the user. Here, the startup word may be "LG tromm".

Then, when the startup word is recognized, the washing machine 100 can process the contents that the user utters in a natural language command. Here, the natural language command can be "wash baby clothes and blankets together".

Then, speech data with respect to the natural language command may be transmitted to a speech recognition server system 200 (S720).

Then, when the natural language command is received, the ASR server 231 may convert the received speech data into text data and transmit the converted text data to an NLP server 233 (S730).

Then, the NLP server 233 may extract one or more keywords for the speech command from the received text data. Here, the extracted keywords may be 'baby clothes' and 'a blanket'.

Then, the NLP server 233 may select 'baby clothes' and 'blankets' as the cloth-words. At this time, the extracted keyword may include a plurality of cloth-words.

Then, the NLP server 233 may determines laundry courses corresponding to the plurality of cloth-words, respectively. For example, a laundry course for 'baby clothes' may be 'baby clothes course'. On the other hand, a laundry course for 'blankets' can be 'blanket course'.

Then, the NLP server 233 may determine whether or not the determined laundry courses are different from each other.

Then, the NLP server 233 may determine that a separate washing is required because the determined laundry courses (i.e., 'baby clothes course' and 'blanket course') are different from each other.

Then, the NLP server 233 may allocate the first and second laundry courses (i.e., 'baby clothes course' and 'blanket course') to the different washing units 150A and 150B respectively, which are included in the washing machine 100.

Specifically, the NLP server 233 determines that the laundry course with regard to the cloth-word can be performed in a mini washer (i.e., the second washing unit 150B) with reference to the above-mentioned database of Table 4. Here, the information on laundry courses for small-amount laundry or separate laundry may be stored in the database of Table 4.

Then, the NLP server 233 can configure the mini washer (i.e., the second washing unit 150B) with the laundry course (i.e., the 'baby clothes course') included in the database of Table 4.

Then, the NLP server 233 can configure the main washer (i.e., the first washing unit 150A) with the remaining laundry course (i.e., 'the blanket course').

Then, the NLP server 233 may transmit data of the first laundry course (i.e., 'a baby clothes course') for the mini washer (i.e., the second washing unit 150B) and the cloth-word (i.e., 'baby clothes') corresponding thereto to the mini washing machine (i.e., the second washing unit 150B) to the control server 240 (S750). Further, the NLP server 233 may transmit data of the second laundry course (i.e., 'the blanket course') for the main washer (i.e., the first washing unit 150A) and the cloth-word (i.e., 'blankets') corresponding thereto to the control server 240.

Additionally, the NLP server 233 may generate data of guide speech that the separate washing is recommended for the plurality of cloth-words inputted and provide the data to the washing machine 100. For example, the NLP sever 233 may generate data of guide speech of "the separate washing is recommended for baby clothes and blankets" and "separate the laundry based on the kinds of laundry and put them respectively into the mini washer and the main washer" and transmit the data to the washing machine 100.

The control server 240 then may configure the mini washer and the main washer of the washing machine 100 based on the received laundry courses (i.e., 'the baby clothes course' and 'the blanket course') and related configuration values selected for the washing units 150A and 150B (S760). That is, the control server 240 may transmit a control command to set 'baby clothes course' in the second washing unit 150B and transmit a control command to set 'blanket course' in the first washing unit 150A.

Then, the control server 240 may receive a result of the configuration of the washing machine 100 (S765).

Then, the control server 240 may generate data of guide speech with regard to the configuration result of the washing machine 100 (S770). For example, the data of guide speech with respect to the configuration result of the washing machine 100 may be "the baby clothes course has been set in the mini washer and a blanket course has been in the main washer".

Then, the control server 240 can transmit the generated data of guide speech to the washing machine 100 through the speech recognition server system 200 (S775).

Then, the washing machine 100 may transmit the received data of guide speech to the TTS server 235 (S780). For example, the washing machine 100 may transmit to the TTS server 235 the data of guide speech about the separate washing received from the NLP server 233 and the data of guide speech about the configuration result of the washing machine 100 received from the control server 240.

Then, the TTS server 235 may convert the received data of guide speech into speech data and transmit the data to the washing machine 100 again (S790).

The washing machine 100 may convert the received speech data into speech (i.e., sound) through a speech guide unit 120 and output the converted speech (i.e., sound). That is, the washing machine 100 may output the guide speech of "I recommend the separate washing for baby clothes and blankets", "the baby clothes course can be used in the mini washer and the blanket course can be used in the main washer" and "separate the laundry based on their kinds and put them respectively into the mini and main washers". However, this is only one example, and the guide speech can be variously modified and implemented.

In summary, the washing machine 100 can notify the user of whether a separate washing for the plurality of laundry is necessary. The user can be provided with information on which washer of the washing machine performs what laundry source for the separate washing. As a result, the present invention enables preventing the problem of dye migration or spreading of contamination among the various kinds of laundry when the laundry is washed at the same time by one single laundry course. Further, even in case that the user does not know well what laundry courses the washing machine 100 provides, it is possible to perform the washing with an optimum laundry course suitable for the plurality of laundry.

Figure 15:
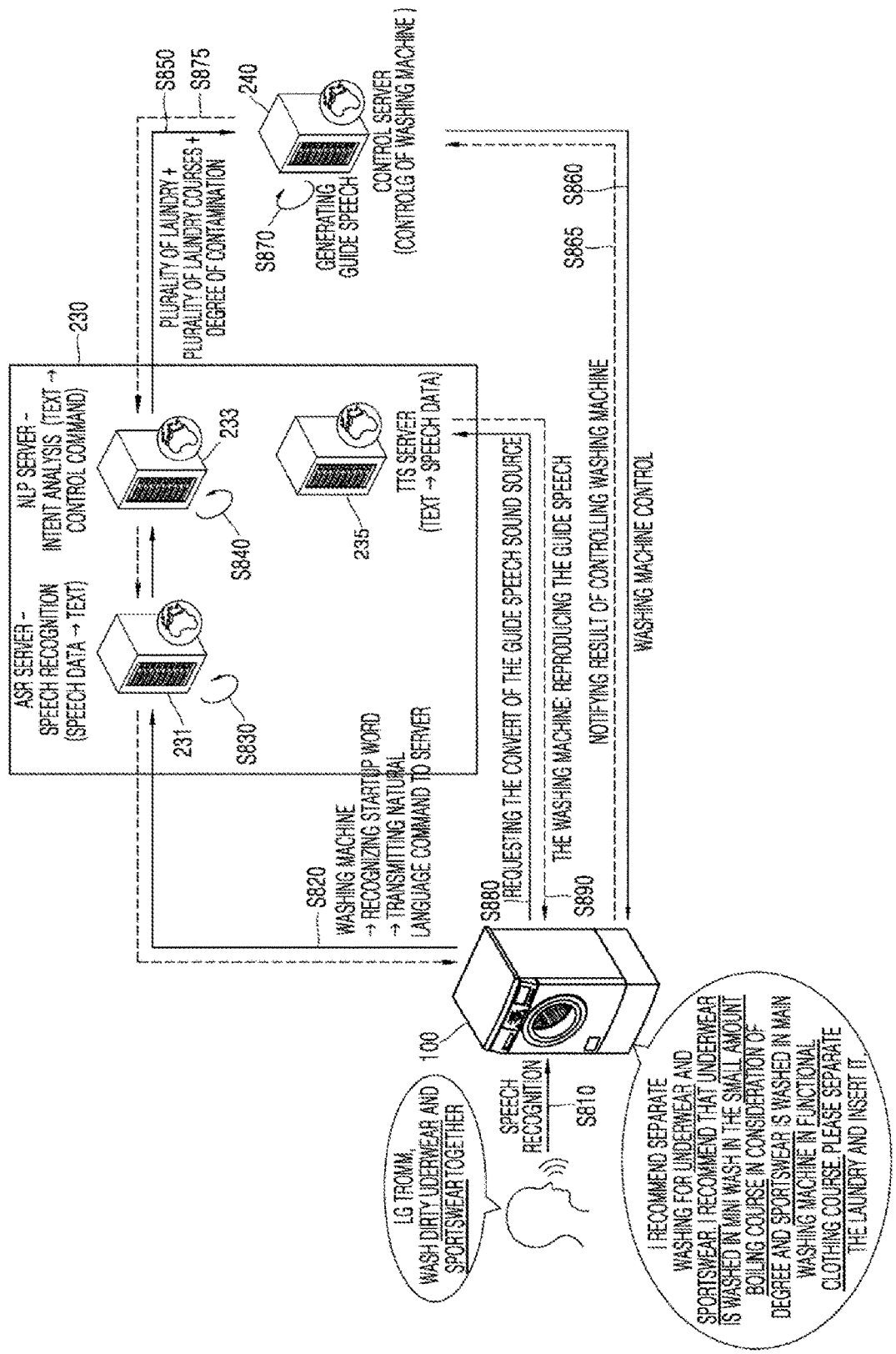
FIG. 15 is a schematic view of a fifth embodiment of a method of controlling speech recognition of the present disclosure.

FIG. 15 is a schematic view of a fifth embodiment of a method of controlling speech recognition according to the present disclosure. Hereinafter, the contents overlapping with the above embodiment will be omitted and the differences will be mainly described.

Referring to FIG. 15, a washing machine 100 receives speech of a user first (S810). Hereinafter, a case where the user utters "LG tromm, wash dirty underwear and sportswear together" will be described as a method of controlling speech recognition according to the present disclosure.

The washing machine 100 can recognize a startup word from speech data of the user. Here, the startup word may be "LG tromm".

Then, when the startup word is recognized, the washing machine 100 can process the contents that the user utters in a natural language command. Here, the natural language command can be "wash dirty underwear and sportswear together".

Then, the speech data with respect to the natural language command may be transmitted to a speech recognition server system 200 (S820).

Then, when the natural language command is received, an ASR server 231 converts the received speech data into text data and transmits the converted text data to an NLP server 233 (S830).

Then, the NLP server 233 extracts one or more keywords for a speech command from the received text data. Here, the extracted keywords can be 'dirty', 'underwear' and 'sportswear'.

Then, the NLP server 233 selects 'dirty' as a stain-word, and select 'underwear' and 'sportswear' as cloth-words. At this time, the extracted keywords include a plurality of cloth-words.

Then, the NLP server 233 determines laundry courses in consideration of the plurality of cloth-words, respectively. For example, a laundry course for the cloth-word 'underwear' may be a 'lingerie/wool course'. On the other hand, a laundry course for the cloth-word 'sportswear' can be a 'functional clothing course'.

Then, the NLP server 233 determines whether or not the determined laundry courses are different from each other.

Then, the NLP server 233 determines that a separate washing is required because the determined laundry courses (i.e., 'a lingerie/wool course' and 'a functional clothing course') are different from each other.

Then, the NLP server 233 allocates the first and second laundry courses (i.e., 'the lingerie/wool course' and 'the functional clothing course') to the different washing units 150A and 150B that the washing machine 100 includes.

Specifically, the NLP server 233 determines whether or not the laundry course for the cloth-word is available for the mini washer (i.e., the second washing unit 150B) with reference to the above-mentioned database of Table 4. Here, information on laundry courses for small-amount washing or separate washing may be stored in the database of Table 4.

Then, the NLP server 233 can configure the mini washer (i.e., the second washing unit 150B) with the laundry course (i.e., 'lingerie/wool course') included in the database of Table 4.

Then, the NLP server 233 can configure the main washer (i.e., a first washing unit 150A) with the remaining laundry course (i.e., 'the functional clothes course').

Then, as the extracted keywords include a stain-word, the NLP server 233 determines which cloth-word of the plurality of cloth-words has a high degree of relevance to the stain-word (i.e., 'dirty').

At this time, based on the positions of the stain-word and the cloth-words in the natural language command, the relation of the meaning of the respective words, the distance between the words in natural language command, and the like, the NLP server 233 may determine which cloth-word has a high relevance to the stain-word. For example, as the stain-word (i.e., 'dirty') is disposed closer to the first cloth-word (i.e., 'underwear') in the natural language command, and the meaning of 'dirty' has a relation with the meaning of the first cloth-word (i.e., 'underwear'), the stain-word may have high relevance to the first cloth-word (i.e., 'underwear').

Then, the NLP server 233 may change at least one of washing options in consideration of the stain-word (i.e., 'dirty') and thus adjust the first laundry course (i.e., "Lingerie/wool") corresponding to the first cloth-word (i.e., 'underwear') having high relevance with the stain-word.

For example, the NLP server 233 may change the existing first laundry course (i.e., 'a lingerie/wool course') into a different laundry course ('a small amount boiling course') in consideration of a contamination degree of the stain-word (i.e., 'dirty'). However, this is only one example, and the adjustment of the laundry course may be variously modified and implemented.

Then, the NLP server 233 transmits data of the first laundry course (i.e., 'small-amount boiling course'), stain-word with respect to the first laundry course (i.e., 'dirty') and cloth-word with respect to the first laundry course (i.e., 'underwear') to a control server 240, and the first laundry course is set in the mini washer (i.e., the second washing unit 150B). Further, the NLP server 233 transmits data of the second laundry course (i.e., 'functional clothing course') and the cloth-word (i.e., 'sportswear') with respect to the second laundry course set in a main washer (i.e., the first washing unit 150A) to the control server 240.

Additionally, the NLP server 233 may generate data of guide speech that recommends a separate washing for the inputted plurality of cloth-words and provide the generated data of guide speech to the washing machine 100. For example, the NLP server 233 generates the data of guide speech of "I recommend the separate washing for underwear and sportswear" and "separate the laundry based on the kinds of laundry and put them respectively in the mini washer and the main washer", and transmit the generated data of guide speech to the washing machine 100.

Then, the control server 240 configures the washing machine 100 with the received laundry courses (i.e., 'small-amount boiling course' and 'functional clothes course') and configuration values determined for the washing machines (S860). That is, the control server 240 transmits a control command that sets 'small-amount boiling course' in the second washing unit 150B and sets 'functional clothing course' in the first washing unit 150A.

Then, the control server 240 receives a result of the configuration of the washing machine 100 (S865).

Then, the control server 240 may generate data of guide speech with regard to the configuration result of the washing machine 100 (S870). For example, the data of guide speech for the configuration result of the washing machine 100 may be "it is recommend that underwear is washed in the mini washer with the 'small-amount boiling course' in consideration of the contamination degree, and sportswear is washed in the main washer with the 'functional clothing course'." and "each laundry course has been set".

Additionally, although not shown in the drawings, the control server 240 may generate data of guide speech including washing tip information related to the stain-word (i.e., 'dirty') and transmit the generated guide speech to the washing machine 100.

Then, the control server 240 can transmit the generated data of guide speech to the washing machine 100 through the speech recognition server system 200 (S875).

Then, the washing machine 100 transmits the received data of guide speech to a TTS server 235 (S780). For example, the washing machine 100 may transmit the data of guide speech about the separate washing received from the NLP server 233 and the data of guide speech about the configuration result of the washing machine 100 received from the control server 240.

Then, the TTS server 235 may convert the received data of guide speech into speech data and transmit the converted speech data to the washing machine 100 again (S890).

The washing machine 100 may convert the received speech data into speech (i.e., sound) through a speech guide unit 120 and output the converted speech (i.e., sound).

Additionally, the washing machine 100 may perform the laundry courses if there is an approval of the user for the set laundry course. As mentioned above, the approval of the user can be made through speech recognition. At this time, the washing machine 100 can perform a simple speech recognition such as the user recognition, and a high level of speech recognition such as a natural language processing, and the like, may be performed by the speech recognition server system 200.

The washing machine 100 may convert the received speech data into speech (i.e., sound) through the speech guide unit 120 and output the speech (i.e., sound).

For example, the washing machine 100 may output the guide speech of "the separate washing is recommend for underwear and sportswear", and "it is recommended that underwear is washed in the mini wash by the 'small-amount boiling course' in consideration of the contamination degree, and sportswear is washed in the main washing machine by the 'functional clothing course'".

Then, when there is an approval of the user for the recommend laundry course, the washing machine 100 can be configured with the recommended laundry course. At this time, the washing machine 100 can maintain a 'waiting' state until the approval of the user is obtained.

Then, when there is an approval of the user, the washing machine 100 can output the guide speech of "each laundry course has been set for the mini washer and the main washer" and "separate the laundry based on the kinds of laundry and put them respectively into the mini washer and the main washer". Then, after the user separates the laundry and put the separated laundry into the washers, and then there is an additional approval of the user, the washing machine 100 can perform the laundry courses. However, this is only one example, and the guide speech can be variously modified and implemented.

In summary, the washing machine 100 can notify the user of whether or not a separate washing for the laundry which uses two different washers in the washing machine 100 is necessary.

Further, the washing machine can provide the user with an optimum laundry course of the laundry in consideration of the contamination, without the user selecting a laundry course or an option of laundry course on his own. Further, the user may be provided with information on which washing unit (i.e., washer) of the washing machine 100 has to perform what laundry course for the separate washing.

Further, after the guide speech recommending the laundry course is outputted, and only when there is an approval of the user, the washing machine 100 can proceed with an operation step of the laundry course. As a result, the user can perform a washing operation through conversation or interaction with the washing machine 100.

As a result, the user can wash various kinds of laundry in term of types of clothes and/or contaminant) with the laundry course that can effectively remove contaminant without an additional configuration by the user. Accordingly, it is possible to efficiently use the washing machine, and a washing performance can be improved. Further, the washing time required for washing the various kinds of laundry can be reduced.

What is claimed is:

1. A method for controlling a washing machine and at least one server system interacting with the washing machine, the method comprising:
    receiving a speech command provided by a user;
    converting the received speech command into text data;
    extracting, from the converted text data, keywords;
    distinguishing, from the extracted keywords, a clothing word and a stain word, wherein the clothing word is a word indicating a kind of clothes, a fabric name of laundry, or a color of laundry, and the stain word is a word indicating a name of a contaminant, a color of a stain, or a chemical property of a stain;
    determining a laundry course based on the clothing word and the stain word;
    retrieving, from a database, washing tip information associated with the stain word; and
    causing the washing machine to provide audio output of speech related to the laundry course and the washing tip information,
    wherein determining the laundry course comprises:
        based on the converted text data comprising first and second clothing words, determining a first laundry course corresponding to the first clothing word and a second laundry course corresponding to the second clothing word, and
        determining whether the first laundry course is identical to the second laundry course, and
    wherein the washing machine comprises a first washing unit and a second washing unit which are capable of performing operations independently from each other, the operations comprising:
        transmitting the first and second laundry courses to a control server based on a determination that the first and second laundry courses are different from each other, and
        configuring the first and second washing units with the first and second laundry courses, respectively.

2. The method of claim 1, wherein determining the laundry course comprises:
    based on the converted text data comprising first and second clothing words, determining the laundry course corresponding to the first clothing word;
    determining that the stain word has greater association with the first clothing word than the second clothing word; and
    changing at least one feature of the laundry course based on the stain word.

3. The method of claim 1, wherein configuring the first and second washing units, respectively, comprises:
    selecting the first or second washing unit for the first or second laundry course by referring to a first database, wherein the first database stores information on laundry courses for washing a small amount of laundry or for a separate washing using at least the second washing unit, which has a smaller washing capacity than the first washing unit,
    configuring the first washing unit with the first laundry course, and
    configuring the second washing unit with the second laundry course, and
    wherein selecting the first or second washing unit for the first or second laundry course comprises determining that the first laundry course is available for the first washing unit and the second laundry course is available for the second washing unit.

4. The method of claim 1, wherein causing the washing machine to provide audio output of speech related to the laundry course and the washing tip information comprises:
    configuring an operation of the washing machine with the first laundry course based on a determination that the first and second laundry courses are identical,
    generating information on a result of the configuration of the washing machine with the first laundry course and the washing tip information associated with the stain word, and
    causing the washing machine to provide audio output of speech related to the generated information.

5. A washing machine, comprising:
    at least one processor; and
    at least one computer memory connected to the at least one processor and storing instructions that, when executed by the at least one processor, perform operations comprising:
    receiving a speech command provided by a user;
    converting the received speech command into text data;
    extracting, from the converted text data, a clothing word and a stain word, wherein the clothing word is a word indicating a kind of clothes, a fabric name of laundry, or a color of laundry, and the stain word is a word indicating a name of a contaminant, a color of a stain, or a chemical property of a stain;
    determining a laundry course based on the clothing word and the stain word;
    controlling an operation of the washing machine based on the determined laundry course;
    retrieving, from a database, washing tip information associated with the stain word; and
    causing the washing machine to provide audio output of speech related to the laundry course and the retrieved washing tip information,
    wherein determining the laundry course comprises:
    based on the converted text data comprising first and second clothing words
        determining a first laundry course corresponding to the first clothing word and a second laundry course corresponding to the second clothing word, and
        determining whether the first laundry course is identical to the second laundry course,
    wherein the washing machine comprises a first washing unit and a second washing unit which are capable of operating independently from each other,
    wherein the washing machine comprises an intent analysis unit and a control unit,
    wherein the intent analysis unit is configured to transmit the first and second laundry courses to the control unit based on a determination that the first and second laundry courses are different from each other, wherein the control unit is configured to configure the first washing unit and the second washing unit with the first and second laundry courses, respectively, and wherein the control unit is further configured to determine that the first laundry course is available for the first washing unit and the second laundry course is available for the second washing unit.

6. The washing machine of claim 5, wherein determining the laundry course comprises selecting the first or second washing unit for the first or second laundry course based on a database that stores laundry course information on laundry courses for washing a small amount of laundry or for a separate washing using at least the second washing unit, which has a smaller washing capacity than the first washing unit.

7. The washing machine of claim 5, wherein determining the laundry course comprises:

based on the converted text data comprising first and second clothing words, determining the laundry course corresponding to the first clothing word;

determining that the stain word has greater association with the first clothing word than the second clothing word; and changing at least one feature of the laundry course based on the stain word.

8. The washing machine of claim 5, wherein the washing machine comprises an intent analysis unit and a control unit, wherein the intent analysis unit is configured to transmit the first laundry course and the stain word to the control unit based on a determination that the first and second laundry courses are identical, wherein the control unit is configured to configure an operation of the washing unit with the first laundry course, and retrieve washing tip information corresponding to the stain word, and wherein causing the washing machine to provide audio output of speech related to the laundry course and the washing tip information comprises:

generating information on a result of the configuration of the washing machine with the first laundry course and the washing tip information associated with the stain word, and causing the washing machine to provide audio output of speech related to the generated information.

9. The washing machine of claim 5, further comprising:

a memory unit comprising a first database that stores information on laundry courses corresponding to clothing words and additional washing options corresponding to stain words, and a second database comprising washing tip information corresponding to stain words, wherein determining the laundry course comprises determining the laundry course corresponding to the clothing word and an additional washing option corresponding to the stain word by referring to the first database, and adjusting the determined laundry course with the additional washing option, and wherein retrieving the washing tip information comprises selecting washing tip information associated with the stain word by referring to the second database.

10. A server system, comprising:

a speech recognition server configured to receive, from a washing machine, data of a speech command provided by a user and convert the received data of the speech command into text data;

an intent analysis server configured to extract, from the converted text data, a clothing word and a stain word and determine a laundry course based on the clothing word, wherein the clothing word is a word indicating a kind of clothes, a fabric name of laundry, or a color of laundry, and the stain word is a word indicating a name of a contaminant, a color of a stain, or a chemical property of a stain; and a control server configured to retrieve, from a database, washing tip information associated with the stain word and transmit, to the washing machine, the retrieved washing tip information, wherein, based on the converted text data comprising first and second clothing words, the intent analysis server is configured to determine whether a first laundry course corresponding to the first clothing word is identical to a second laundry course corresponding to the second clothing word, wherein the intent analysis server is configured to transmit the first and second laundry courses to the control server based on a determination that the first and second laundry courses are different from each other, wherein the control server is configured to control a first washing unit to perform the first laundry course and control a second washing unit to perform the second laundry course, and wherein the washing machine comprises the first washing unit and the second washing unit which are capable of operating independently from each other.

11. The server system of claim 10, wherein the control server is configured to control an operation of the washing machine based on the laundry course and generate information on a result of the configuration of the washing machine and the washing tip information.

12. The server system of claim 11, further comprising a speech conversion server that is configured to receive data of speech related to the information on the configuration result of the washing machine and the washing tip information, and to convert the received data of speech into speech data and transmit the converted speech data to the washing machine.

13. The server system of claim 10, wherein, based on the converted text data comprising first and second clothing words, the intent analysis server is configured to extract the first and second clothing words, determine the laundry course corresponding to the first clothing word, and determine that the stain word has greater association with the first clothing word than the second clothing word, and wherein the intent analysis server is further configured to change at least one feature of the laundry course based on the stain word.

14. The server system of claim 10, wherein the intent analysis unit is configured to determine the laundry course by selecting the first or second washing unit for the first or second laundry course based on a database that stores laundry course information on laundry courses for washing a small amount of laundry or for a separate washing using at least the second washing unit, which has a smaller washing capacity than the first washing unit.

* * * * *